US012763870B2

(12) United States Patent
Song et al.

(10) Patent No.: US 12,763,870 B2
(45) Date of Patent: Oct. 13, 2026

(54) ENHANCED SIGNALING FOR UNEQUAL MODULATION AND MODULATION AND CODING SCHEMES IN SINGLE USER WIRELESS TRANSMISSIONS

(71) Applicant: Intel Corporation, Santa Clara, CA (US)

(72) Inventors: Hao Song, Santa Clara, CA (US); Yoav Eisenberg, Yehud-Monosson (IL); Assaf Gurevitz, Ramat Hasharon (IL); Thomas J. Kenney, Portland, OR (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/650,378

(22) Filed: Apr. 30, 2024

(65) Prior Publication Data

US 2024/0283561 A1 Aug. 22, 2024

(51) Int. Cl.

| | |
|---|---|
| ***H04L 1/00*** | (2006.01) |
| ***G06F 9/54*** | (2006.01) |
| ***G06F 16/242*** | (2019.01) |
| ***G06F 16/953*** | (2019.01) |
| ***H04L 67/60*** | (2022.01) |
| ***H04W 28/06*** | (2009.01) |

(52) U.S. Cl.

CPC ............ *H04L 1/0003* (2013.01); *G06F 9/547* (2013.01); *G06F 16/2433* (2019.01); *G06F 16/953* (2019.01); *H04L 67/60* (2022.05); *H04W 28/065* (2013.01)

(58) Field of Classification Search

None

See application file for complete search history.

(56) References Cited

U.S. PATENT DOCUMENTS

2025/0016039 A1* 1/2025 Hart .................... H04L 27/2602
2025/0126010 A1* 4/2025 Huang .................... H04L 27/34

* cited by examiner

*Primary Examiner* — Anh Ngoc M Nguyen
(74) *Attorney, Agent, or Firm* — Gray Ice Higdon, PLLC

(57) ABSTRACT

This disclosure describes systems, methods, and devices for signaling multiple modulation and coding schemes for a single user. A device may generate a common field of an ultra-high reliability signal (UHR-SIG) content channel field, the common field including signaling for station devices; generate a number of spatial streams (NSS) subfield of a user specific field of the UHR-SIG content channel field, the user specific field addressed to a first station device of the multiple station devices; generate a 6-bit modulation and coding scheme (MCS) subfield of the user specific field, wherein the 6-bit MCS subfield maps, based on a number of spatial streams signaled by the NSS subfield, to one or more MCSs assigned to the first station device; generate a frame including the UHR-SIG content channel field, wherein a user field of the user specific field includes at least 22 bits including the MCS subfield; and send the frame.

20 Claims, 12 Drawing Sheets

ENHANCED SIGNALING FOR UNEQUAL MODULATION AND MODULATION AND CODING SCHEMES IN SINGLE USER WIRELESS TRANSMISSIONS

TECHNICAL FIELD

This disclosure generally relates to systems and methods for wireless communications and, more particularly, to signaling for unequal modulation and modulation and coding schemes in single user wireless transmissions.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
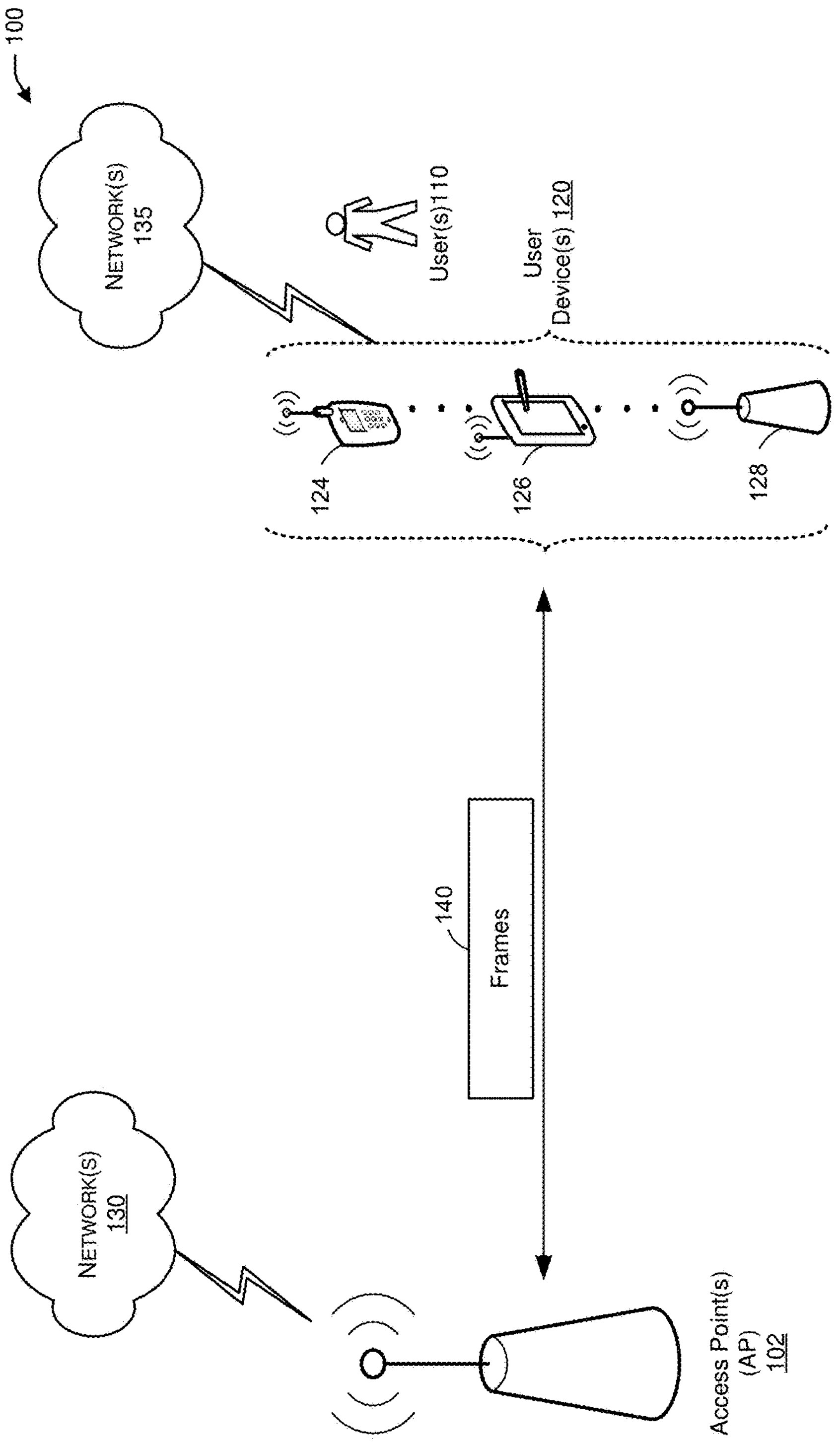
FIG. 1 is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

The 802.11 technical standards define wireless communications for Wi-Fi, including for signal modulation and modulation and coding schemes (MCSs). The MCS defines the bits that can be used in a symbol, and may depend on quality of a wireless communication link. The MCS defines a modulation and a coding rate for a transmission.

Unequal modulation over spatial streams is defined as varying modulation types/Quadrature Amplitude Modulations (QAMs) are assigned to different spatial streams to adapt to their Signal-Interference-Noise Ratio (SINR) conditions. Multiple MCSs may be assigned to a same station device using unequal modulation. New Modulation and Coding Schemes (MCSs) are added to the current Extremely High Throughput (EHT)-MCSs to constitute Ultra High Reliability (UHR)-MCSs for a higher data rate achieved in UHR/802.11bn/Wi-Fi 8 systems. In the current 802.11 EHT Physical Layer (PHY) specifications, there are 14 types of MCSs, which are shown in Table 1 below (there are 16 EHT-MCS indexes in Table 1, since BPSK (binary phase-shift keying) with 1/2 code rate appears three times in three different application scenarios). Both unequal modulation and adding new MCSs are promising technologies for UHR/802.11bn/Wi-Fi 8 systems, which can effectively enhance the performance of throughput and reliability.

TABLE 1

EHT MCSs in the Current 802.11 EHT Specifications

| EHT-MCS index | Modulation | Coding Rate |
|---|---|---|
| 0 | BPSK | 1/2 |
| 1 | QPSK | 1/2 |
| 2 | | 3/4 |
| 3 | 16-QAM | 1/2 |
| 4 | | 3/4 |
| 5 | 64-QAM | 2/3 |
| 6 | | 3/4 |
| 7 | | 5/6 |
| 8 | 256-QAM | 3/4 |
| 9 | | 5/6 |
| 10 | 1024-QAM | 3/4 |
| 11 | | 5/6 |
| 12 | 4096-QAM | 3/4 |
| 13 | | 5/6 |
| 14 | BPSK-DCM (DUP) | 1/2 |
| 15 | BPSK-DCM | 1/2 |

Unequal modulation and new MCSs are promising technologies for Ultra High Reliability (UHR)/802.11bn/Wi-Fi 8 systems, which can effectively enhance the performance, such data rate and reliability. However, unequal modulation and new MCSs can also include extra complexity and overhead. To restrict complexity and overhead, some restrictions are applied, such as only the limited number of new MCSs added in 802.11bn/Wi-Fi 8 systems and the unequal modulation patterns applied to unequal modulation. With unequal modulation, newly added MCSs, and these restrictions, the current EHT-SIG (extremely high throughput signal field) cannot directly be applied to Single User (SU) transmissions in UHR/802.11bn/Wi-Fi 8 systems.

In one or more embodiments, a new UHR-SIG field is defined and designed to enable unequal modulation and newly added MCSs with a relatively low complexity and overhead for SU transmissions in UHR/802.11bn/Wi-Fi 8 systems.

New signaling and system procedures, such as UHR-SIG, Trigger Frame, stream parser, and segment parser, have been proposed to enable unequal modulation in MU-MIMO transmissions in 802.11bn/Wi-Fi 8 systems.

Previous solutions have been proposed for Multiple User (MU)-MIMO transmissions, but do not consider SU transmissions. Moreover, the restrictions to mitigate complexity and overhead brought by unequal modulation and newly added MCSs are not taken into account.

In the present disclosure, a new UHR-SIG is defined and proposed to enable unequal modulation and newly added MCSs with a relatively low complexity and overhead for SU transmissions in UHR/802.11bn/Wi-Fi 8 systems. Also, the proposed UHR-SIG is also applicable to the restrictions used to restrict complexity and overhead caused by unequal modulation and newly added MCSs.

The present disclosure may enable unequal modulation and New MCSs in Single User (SU) transmissions in the next generation of Wi-Fi systems, UHR/802.11bn/Wi-Fi 8 systems. Unequal modulation and new MCSs are promising technologies, which may be significant features of 802.11bn/Wi-Fi 8 systems.

In one or more embodiments, to restrict complexity and overhead, some restrictions are applied to unequal modulation over spatial streams and new MCSs, including:

Unequal modulation is only applied to a Single User (SU) transmission over full bandwidth or on an RU.

Only modulations/QAMs are different on different spatial streams and all spatial streams share the same coding, so-called unequal modulation.

Unequal modulation is only applied to no more than 4 spatial streams.

At present, there could be totally 28 MCSs, which are constructed by 7 types of modulations, BPSK, QPSK, 16QAM, 64QAM, 256QAM, 1024QAM, and 4096QAM, and 4 types of code rates, 1/2, 2/3, 3/4, and 5/6. Thus, for adding new MCSs, there are 14 unused MCSs apart from the 14 MCSs that have already been listed in EHT-MCSs of the current 802.11 EHT PHY specifications. It is unnecessary to add all 14 unused MCSs into UHR-MCSs for 802.11bn/Wi-Fi 8 systems, and only those unused MCSs that can significantly improve the system throughput are added. For example, only 4 new MCSs, including QPSK (quadrature phase-shift keying) with the code rate 2/3, 16QAM with the code rate 2/3, 256QAM with the code rate 2/3, and 16QAM with the code rate 5/6, are added to constitute UHR-MCSs along with the 14 MCSs in EHT-MCSs. In this example, the UHR-MCSs index table can be designed as shown in Table 2 below.

TABLE 2

Proposed New UHR MCSs in 802.11bn/Wi-Fi 8 Systems

| EHT-MCS index | Modulation | Coding Rate |
|---|---|---|
| 0 | BPSK | 1/2 |
| 1 | QPSK | 1/2 |
| 2 | | 3/4 |
| 3 | 16-QAM | 1/2 |
| 4 | | 3/4 |
| 5 | 64-QAM | 2/3 |
| 6 | | 3/4 |
| 7 | | 5/6 |
| 8 | 256-QAM | 3/4 |
| 9 | | 5/6 |

TABLE 2-continued

Proposed New UHR MCSs in 802.11bn/Wi-Fi 8 Systems

| EHT-MCS index | Modulation | Coding Rate |
|---|---|---|
| 10 | 1024-QAM | 3/4 |
| 11 | | 5/6 |
| 12 | 4096-QAM | 3/4 |
| 13 | | 5/6 |
| 14 | BPSK-DCM (DUP) | 1/2 |
| 15 | BPSK-DCM | 1/2 |
| 16 | QPSK | 2/3 |
| 17 | 16QAM | 2/3 |
| 18 | 256QAM | 2/3 |
| 19 | 16QAM | 5/6 |

(5) Unequal modulations assigned to different spatial streams are restricted to several unequal modulation patterns for low complexity, low overhead, and easy signaling, in which the modulation/QAM gap between two spatial streams is restricted to a fixed order. Table 3 below gives an example of unequal modulation patterns, where NSS represent the number of spatial streams. For an example with three spatial streams (NSS=3), QAM/QAM-x/QAM-y denotes that the modulation assigned to the first spatial streams is QAM, and modulations of the second spatial stream and the third spatial stream are the modulation x order lower than QAM and the modulation y order lower than QAM, respectively. Modulations assigned to different spatial streams are always in descending order, namely x always smaller than or equal to y, and x and y can be 0. Note that when x=y=0, the pattern becomes QAM/QAM/QAM, representing equal MCS, where different spatial streams have the same modulation/QAM order.

TABLE 3

Unequal Modulation Patterns

| NSS | Unequal Modulation patterns |
|---|---|
| 2 | QAM/OAM |
| | QAM/QAM-1 |
| | QAM/QAM-2 |
| 3 | QAM/QAM/QAM |
| | QAM/QAM/QAM-1 |
| | QAM/QAM/QAM-2 |
| | QAM/QAM-1/QAM-2 |
| 4 | QAM/QAM/QAM/QAM |
| | QAM/QAM/QAM/QAM-1 |
| | QAM/QAM/QAM/QAM-2 |
| | QAM/QAM/QAM-1/QAM-2 |

With unequal modulation, newly added MCSs, and the afore-mentioned restrictions, the current EHT-SIG is not applicable to 802.11bn/Wi-Fi 8 systems. Therefore, UHR-SIG is designed in this invention to enable unequal modulation and newly added MCSs in Single User (SU) transmission over full bandwidth or a resource unit (RU) in 802.11bn/Wi-Fi 8 systems. New UHR-SIG is designed based on EHT-SIG for easy implementation and compatibility. The EHT-SIG of the SU transmission includes a Common field and a User Specific field. As only one single user exists, only one User field is in the User Specific field. Based on EHT-SIG, the following places are modified and re-organized in UHR-SIG:

(1) More bits are required in MCS field to support unequal modulation and the newly added MCSs. For example, six bits are required to support UHR-MCSs with newly added MCSs shown in Table 2 above and unequal modulation patterns shown in Table 3 above.

(2) MCS subfield in UHR-SIG needs to be defined to support both unequal modulation and newly added MCSs rather than only supporting one equal MCS as the current EHT PHY specifications. For an example with the newly added MCSs in Table 2 and unequal modulation patterns shown in Table 3 above, a new MCS subfield is defined in Table 4, Table 5, and Table 6 below, which uses six bits to indicate equal MCS with the newly added MCSs or unequal modulations with the unequal modulation patterns and the newly added MCSs in the cases of 2 spatial streams, three spatial streams, and four spatial streams, respectively. The basic principles of designing the new MCS field are summarized as follows. For different NSSs (Numbers of Spatial Streams), we reuse the defined 6-bit MCS subfield and map each of the 6-bit values to either an equal MCS assignment or an unequal modulation/QAM assignment. An equal MCS assignment contains a modulation/QAM with a code rate, while an unequal modulation/QAM assignment contains a modulation combination with a code rate. For each NSS, the 6-bit binary number starts from 000000 (0 in decimal) and at maximum can end at 111111 (63 in decimal). In other words, for each NSS, it can at maximum indicate 64 types of equal MCS or unequal modulations. Also, in the MCS subfield tables, the indexes represented by 6 bits of the MCS subfield of unequal modulations is ordered according to the code rate, from 1/2 to 5/6. In other words, modulation/QAM combinations with the same code rate stay together in the 6-bit indexes in the MCS subfield tables. For example, in Table 5, modulation/QAM combinations with the code rate 2/3 stay together in the 6-bit indexes from 000111 (7 in decimal) to 010001 (17). This is because in unequal modulation only modulations/QAMs are different on different spatial streams, while all spatial streams share the same code rate. Accordingly, only modulations/QAMs owning the same code rate can be combined together to constitute an unequal modulation/QAM.

A user can obtain the number of spatial streams information through the NSS subfield in the User field in the User Specific field of its UHR-SIG. After obtaining the number of spatial streams, the user can obtain its equal MCS assignment or unequal modulation/QAM assignment by checking the MCS subfield table corresponding to the obtained NSS. For example, if a user's NSS is 3 and the 6-bit binary number in its MCS subfield is 010110 (22 in decimal), the user finds its equal MCS assignment or unequal modulation/QAM assignment by checking the table of MCS subfield with 3 spatial streams. 010110 in the MCS subfield with NSS=3 indicates the unequal modulation/QAM assignment of 64QAM/64QAM/16QAM, where 64QAM, 64QAM, and 16 QAM are assigned to its first, second, and third spatial streams, respectively. In summary, our main idea is to reload the index table of the MCS subfield according to the number of spatial streams. For different numbers of spatial streams, the table of the MSC subfield indicates different sets of MCS combinations. The arrangement of the table can be different from Tables 4-6, which are organized according to code rate first and then modulation order. This idea can be applied to the MCS subfield of 802.11bn for a single user transmission on full bandwidth or an (OFDMA) RU.

TABLE 4

MCS Subfield in UHR-SIG for Two Spatial Streams

| NSS | Code rate | B5B4B3B2B1B0 | QAM/QAM (Equal) | QAM/QAM-1 | QAM/QAM-2 |
|---|---|---|---|---|---|
| 2 | 1/2 | 000000 (0) | BPSK/BPSK | | |
| | | 000001-000010 (1-2) | QPSK/QPSK | QPSK/BPSK | |
| | | 00001-1000101 (3-5) | 16QAM/16QAM | 16QAM/QPSK | 16QAM/BPSK |
| | 2/3 | 000110 (6) | QPSK/QPSK | | |
| | | 000111-001000 (7-8) | 16QAM/16QAM | 16QAM/QPSK | |
| | | 001001-001011 (9-11) | 64QAM/64QAM | 64QAM/16QAM | 64QAM/QPSK |
| | | 001100-001110 (12-14) | 256QAM/256QAM | 256QAM/64QAM | 256QAM/16QAM |
| | 3/4 | 001111 (15) | QPSK/QPSK | | |
| | | 010000-010001 (16-17) | 16QAM/16QAM | 16QAM/QPSK | |
| | | 010010-010100 (18-20) | 64QAM/64QAM | 64QAM/16QAM | 64QAM/QPSK |
| | | 010101-010111 (21-23) | 256QAM/256QAM | 256QAM/64QAM | 256QAM/16QAM |
| | | 011000-011010 (24-26) | 1024QAM/1024QAM | 1024QAM/256QAM | 1024QAM/64QAM |
| | | 011011-011101 (27-29) | 4096QAM/4096QAM | 4096QAM/1024QAM | 4096QAM/256QAM |
| | 5/6 | 011110 (30) | 16QAM/16QAM | | |
| | | 011111-100000 (31-32) | 64QAM/64QAM | 64QAM/16QAM | |
| | | 100001-100011 (33-35) | 256QAM/256QAM | 256QAM/64QAM | 256QAM/16QAM |

TABLE 4-continued

| MCS Subfield in UHR-SIG for Two Spatial Streams | | | | | |
|---|---|---|---|---|---|
| NSS | Code rate | B5B4B3B2B1B0 | QAM/QAM (Equal) | QAM/QAM-1 | QAM/QAM-2 |
| | | 100100-100110 (36-38) | 1024QAM/1024QAM | 1024QAM/256QAM | 1024QAM/64QAM |
| | | 100111-101001 (39-41) | 4096QAM/4096QAM | 4096QAM/1024QAM | 4096QAM/256QAM |

TABLE 5

| MCS Subfield in UHR-SIG for Three Spatial Streams | | | | | | |
|---|---|---|---|---|---|---|
| NSS | Code rate | B5B4B3B2B1B0 | QAM/QAM/QAM (Equal) | QAM/QAM/ QAM-1 | QAM/QAM/ QAM-2 | QAM/QAM-1/ QAM-2 |
| 3 | 1/2 | 000000 (0) | BPSK/BPSK/ BPSK | | | |
| | | 000001- 000010 (1-2) | QPSK/QPSK/ QPSK | QPSK/QPSK/ BPSK | | |
| | | 000011- 000110 (3-6) | 16QAM/16QAM/ 16QAM | 16QAM/16QAM/ QPSK | 16QAM/16QAM/ BPSK | 16QAM/QPSK/ BPSK |
| | 2/3 | 000111 (7) | QPSK/QPSK/ QPSK | | | |
| | | 001000- 001001 (8-9) | 16QAM/16QAM/ 16QAM | 16QAM/16QAM/ QPSK | | |
| | | 001010- 001101 (10-13) | 64QAM/64QAM/ 64QAM | 64QAM/64QAM/ 16QAM | 64QAM/64QAM/ QPSK | 64QAM/16QAM/ QPSK |
| | | 001110- 010001 (14-17) | 256QAM/ 256QAM/ 256QAM | 256QAM/256QAM/ 64QAM | 256QAM/256QAM/ 16QAM | 256QAM/64QAM/ 16QAM |
| | 3/4 | 010010 (18) | QPSK/QPSK/ QPSK | | | |
| | | 010011- 010100 (19-20) | 16QAM/16QAM/ 16QAM | 16QAM/16QAM/ QPSK | | |
| | | 010101- 011000 (21-24) | 64QAM/64QAM/ 64QAM | 64QAM/64QAM/ 16QAM | 64QAM/64QAM/ QPSK | 64QAM/16QAM/ QPSK |
| | | 011001- 011100 25-28) | 256QAM/ 256QAM/ 256QAM | 256QAM/ 256QAM/ 64QAM | 256QAM/ 256QAM/ 16QAM | 256QAM/ 64QAM/ 16QAM |
| | | 011101- 100000 (29-32) | 1024QAM/ 1024QAM/ 1024QAM | 1024QAM/ 1024QAM/ 256QAM | 1024QAM/ 1024QAM/ 64QAM | 1024QAM/ 256QAM/ 64QAM |
| | | 100001- 100100 (33-36) | 4096QAM/ 4096QAM/ 4096QAM | 4096QAM/ 4096QAM/ 1024QAM | 4096QAM/ 4096QAM/ 256QAM | 4096QAM/ 1024QAM/ 256QAM |
| | 5/6 | 100101 (37) | 16QAM/16QAM/ 16QAM | | | |
| | | 100110- 100111 (38-39) | 64QAM/64QAM/ 64QAM | 64QAM/64QAM/ 16QAM | | |
| | | 101000- 101011 (40-43) | 256QAM/ 256QAM/ 256QAM | 256QAM/ 256QAM/ 64QAM | 256QAM/ 256QAM/ 16QAM | 256QAM/ 64QAM/ 16QAM |
| | | 101100- 101111 (44-47) | 1024QAM/ 1024QAM/ 1024QAM | 1024QAM/ 1024QAM/ 256QAM | 1024QAM/ 1024QAM/ 64QAM | 1024QAM/ 256QAM/ 64QAM |
| | | 110000- 110011 (48-51) | 4096QAM/ 4096QAM/ 4096QAM | 4096QAM/ 4096QAM/ 1024QAM | 4096QAM/ 4096QAM/ 256QAM | 4096QAM/ 1024QAM/ 256QAM |

TABLE 6

MCS Subfield in UHR-SIG for Four Spatial Streams

| NSS | Code rate | B5B4B3B2B1B0 | QAM/QAM/ QAM/QAM (Equal) | QAM/QAM/ QAM/QAM-1 | QAM/QAM/ QAM/QAM-2 | QAM/QAM/ QAM-1/QAM-2 |
|---|---|---|---|---|---|---|
| 4 | 1/2 | 000000 (0) | BPSK/BPSK/ BPSK/BPSK | | | |
| | | 000001- 000010 (1-2) | QPSK/QPSK/ QPSK/QPSK | QPSK/QPSK/ QPSK/BPSK | | |
| | | 000011- 000110 (3-6) | 16QAM/16QAM/ 16QAM/16QAM | 16QAM/16QAM/ 16QAM/QPSK | 16QAM/16QAM/ 16QAM/BPSK | 16QAM/16QAM/ QPSK/BPSK |
| | 2/3 | 000111 (7) | QPSK/QPSK/ QPSK/QPSK | | | |
| | | 001000- 001001 (8-9) | 16QAM/16QAM/ 16QAM/16QAM | 16QAM/16QAM/ 16QAM/QPSK | | |
| | | 001010- 001101 (10-13) | 64QAM/64QAM/ 64QAM/64QAM | 64QAM/64QAM/ 64QAM/16QAM | 64QAM/64QAM/ 64QAM/QPSK | 64QAM/64QAM/ 16QAM/QPSK |
| | | 001110- 010001 (14-17) | 256QAM/256QAM/ 256QAM/256QAM | 256QAM/256QAM/ 256QAM/64QAM | 256QAM/256QAM/ 256QAM/16QAM | 256QAM/256QAM/ 64QAM/16QAM |
| | 3/4 | 010010 (18) | QPSK/QPSK/ QPSK/QPSK | | | |
| | | 010011- 010100 (19-20) | 16QAM/16QAM/ 16QAM/16QAM | 16QAM/16QAM/ 16QAM/QPSK | | |
| | | 010101- 011000 (21-24) | 64QAM/64QAM/ 64QAM/64QAM | 64QAM/64QAM/ 64QAM/16QAM | 64QAM/64QAM/ 64QAM/QPSK | 64QAM/64QAM/ 16QAM/QPSK |
| | | 011001- 011100 (25-28) | 256QAM/256QAM/ 256QAM/256QAM | 256QAM/256QAM/ 256QAM/64QAM | 256QAM/256QAM/ 256QAM/16QAM | 256QAM/256QAM/ 64QAM/16QAM |
| | | 011101- 100000 (29-32) | 1024QAM/1024QAM/ 1024QAM/1024QAM | 1024QAM/1024QAM/ 1024QAM/256QAM | 1024QAM/1024QAM/ 1024QAM/64QAM | 1024QAM/1024QAM/ 256QAM/64QAM |
| | | 100001- 100100 (33-36) | 4096QAM/4096QAM/ 4096QAM/4096QAM | 4096QAM/4096QAM/ 4096QAM/1024QAM | 4096QAM/4096QAM/ 4096QAM/256QAM | 4096QAM/4096QAM/ 1024QAM/256QAM |
| | 5/6 | 100101 (37) | 16QAM/16QAM/ 16QAM/16QAM | | | |
| | | 100110- 100111 (38-39) | 64QAM/64QAM/ 64QAM/64QAM | 64QAM/64QAM/ 64QAM/16QAM | | |
| | | 101000- 101011 (40-43) | 256QAM/256QAM/ 256QAM/256QAM | 256QAM/256QAM/ 256QAM/64QAM | 256QAM/256QAM// 256QAM/16QAM | 256QAM/256QAM/ 64QAM/16QAM |
| | | 101100- 101111 (44-47) | 1024QAM/1024QAM/ 1024QAM/1024QAM | 1024QAM/1024QAM/ 1024QAM/256QAM | 1024QAM/1024QAM// 1024QAM/64QAM | 1024QAM/1024QAM/ 256QAM/64QAM |
| | | 110000- 110011 (48-51) | 4096QAM/4096QAM/ 4096QAM/4096QAM | 4096QAM/4096QAM/ 4096QAM/1024QAM | 4096QAM/4096QAM// 4096QAM/256QAM | 4096QAM/4096QAM/ 1024QAM/256QAM |

(3) As more bits need to be allocated or added to the MCS subfield, the format of UHR-SIG should be different from EHT-SIG. In the present disclosure, three design options of UHR-SIG, which can be used by SU transmission, are proposed. Also, the three design options are designed with the newly added MCSs shown in Table 2 and unequal modulation patterns shown in Table 3. Six bits are required in the MCS subfield of UHR-SIG, while there are only four bits in the MCS subfield of EHT-SIG. As a result, Two additional bits are required in the MCS subfield of UHR-SIG.

In the first design option, two additional bits in the MCS subfield of UHR-SIG come from one reserved bit and the 1-bit Coding subfield in the User field of EHT-SIG. The Coding subfield is utilized to indicate Low-Density Parity Check (LDPC) or binary convolutional code (BCC) used in data field. In the EHT version of Wi-Fi systems (802.11be) or higher versions, generally only LDPC is applied to transmit data. Therefore, the Coding subfield may be unnecessary, as only LDPC will be applied. One bit could be saved from the Coding subfield and used in the MCS subfield. Because it is likely that 2× lifted LDPC codes will be adopted by 802.11bn as optional codes for data transmission, the 1-bit Coding subfield may be still needed for indicating which of the legacy LDPC code and 2× lifted LDPC code is used in the data portion of the data PPDU. If it is not possible to repurpose 1 bit from the Coding subfield, we need to find another bit out of the 22-bit User field or increase the User field to 23 bits.

In the second design option, two additional bits are directly added into the MCS subfield, while keeping other parts of UHR-SIG unchanged. Accordingly, the length of the User field increases from 22 bits to 24 bits.

In the third design option, the additional two bits of the User field may be acquired from Disregard bits in the Common field. Originally, there are four Disregard bits in the Common field of EHT-SIG. Two bits out of four Disregard bits in the Common field can be re-allocated to the MCS subfield for unequal modulation purpose. As a result, in UHR-SIG, Disregard bits in the Common field reduces from four bits to two bits, and the reduced two bits are added to the MCS subfield, making the MCS subfield six bits. Moreover, the length of the Common field and the length of the User field reduce from 20 bits to 18 bits and increase from 22 bits to 24 bits, respectively.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment 100, in accordance with one or more example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 4:
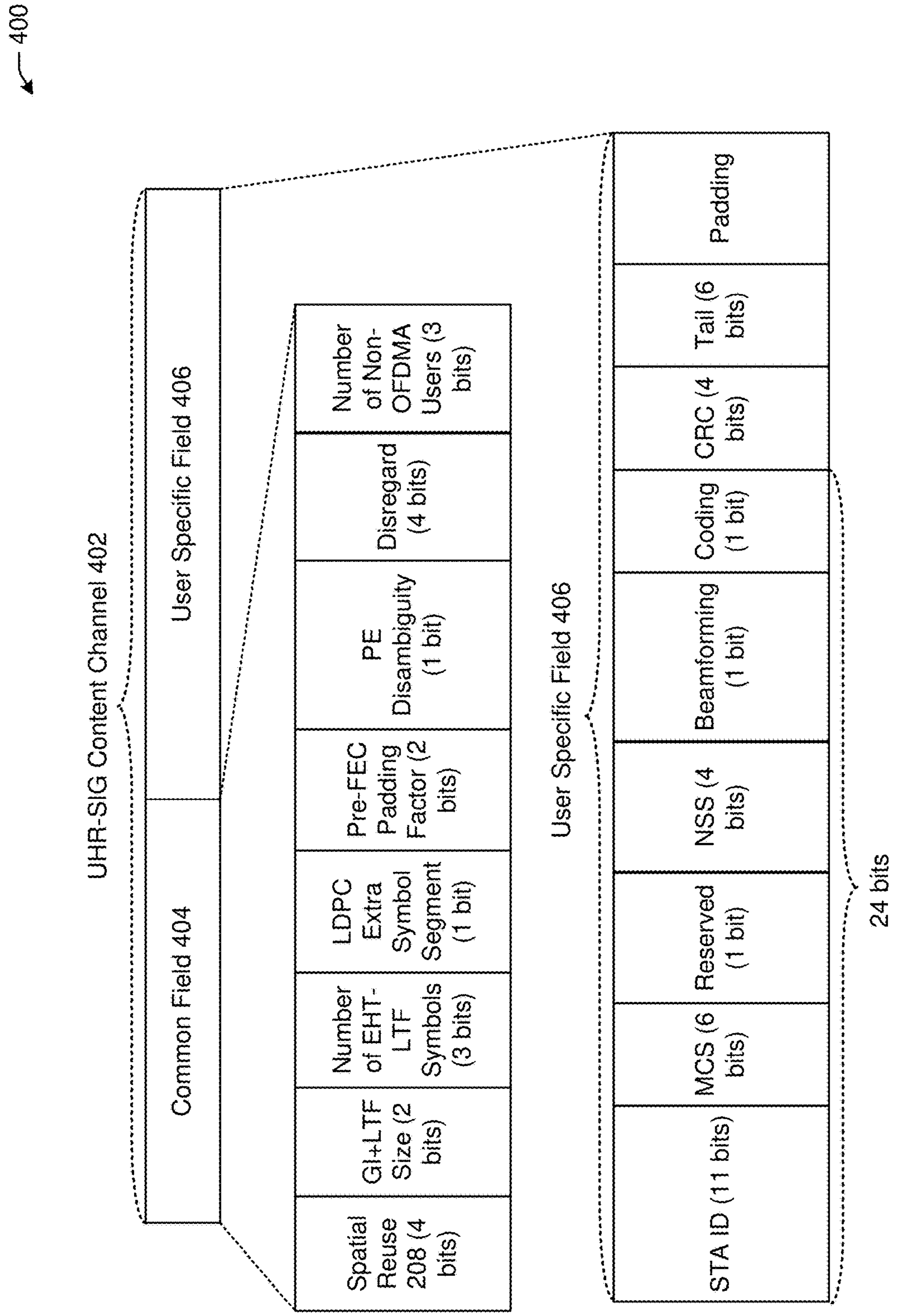
FIG. 4 is an example portion of an Ultra High Reliability (UHR) signal field content channel, in accordance with one or more example embodiments of the present disclosure.
Figure 5:
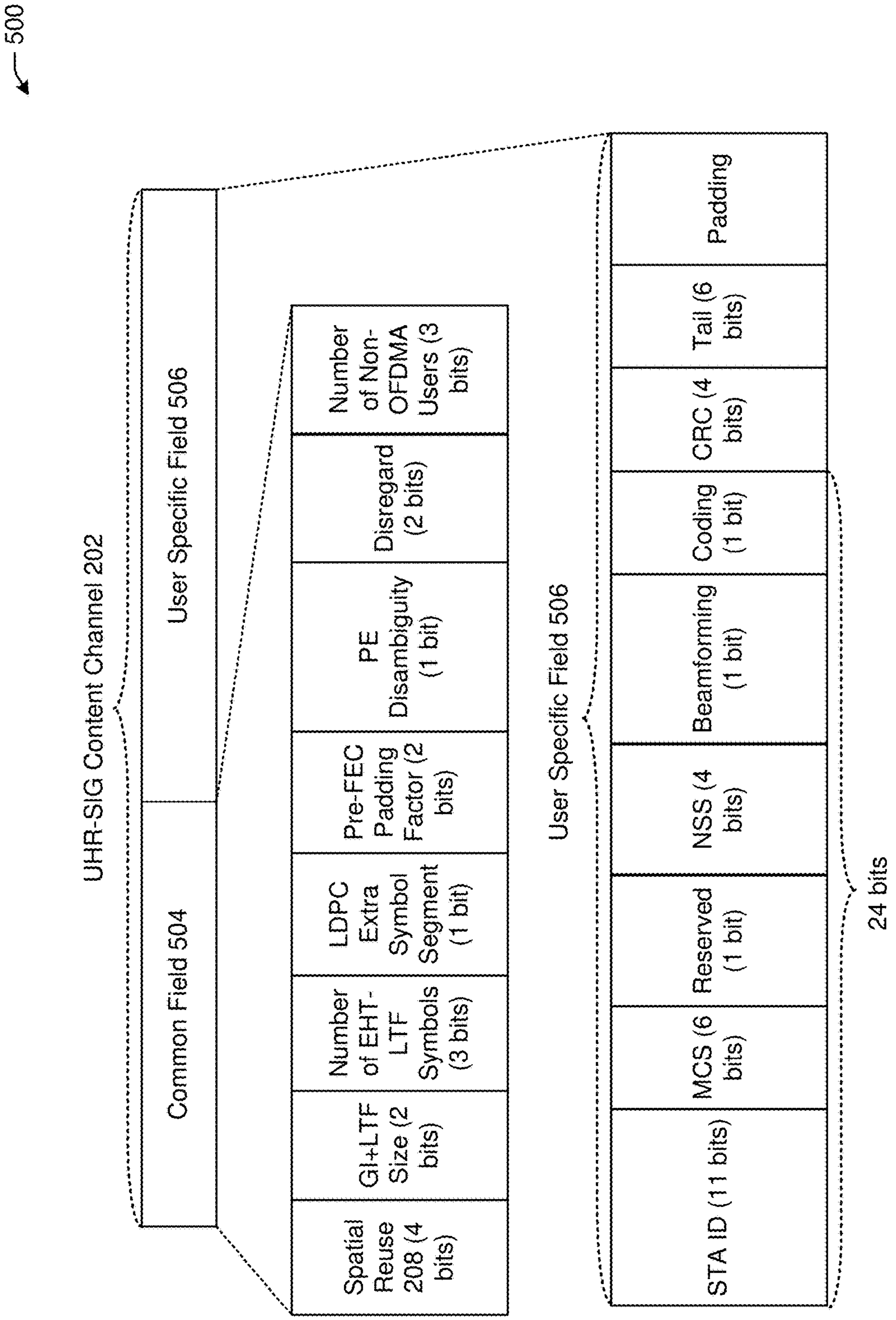
FIG. 5 is an example portion of an Ultra High Reliability (UHR) signal field content channel, in accordance with one or more example embodiments of the present disclosure.

In some embodiments, the user devices 120 and the AP 102 may include one or more computer systems similar to that of the functional diagram of FIG. 4 and/or the example machine/system of FIG. 5.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one or more embodiments, and with reference to FIG. 1, the AP 102 and the user devices 120 may exchange frames 140. The frames 140 may include 802.11 frames, such as single user (SU) transmissions, multi-user (MU) transmissions, signaling of MCSs for SU and MU transmissions, EHT transmissions (e.g., PPDUs), UHR transmissions (PPDUs), and the like, as defined herein.

Figure 2:
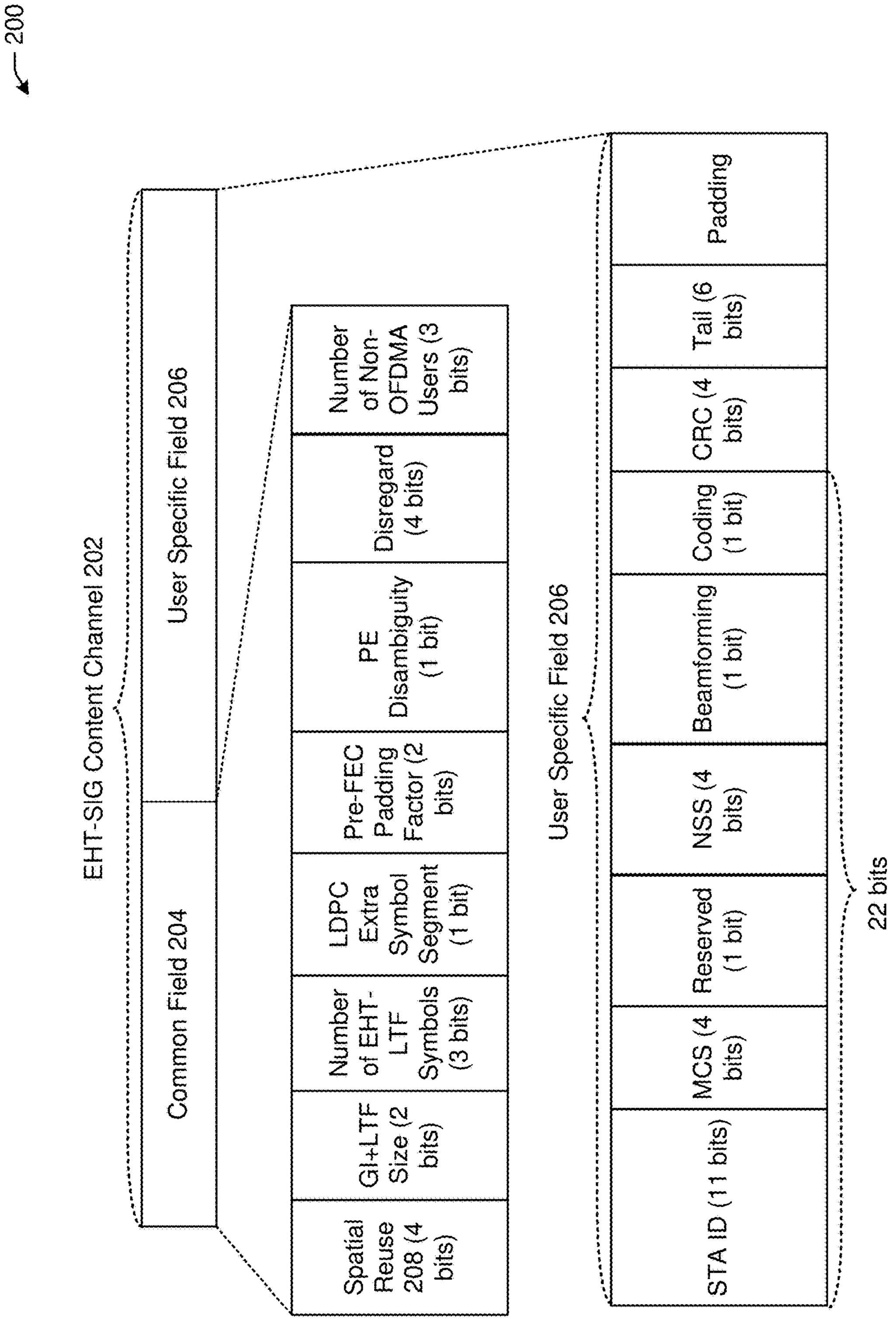
FIG. 2 is an example portion of an extremely high throughput (EHT) signal field (EHT-SIG) content channel, in accordance with one or more example embodiments of the present disclosure.

FIG. 2 is an example portion 200 of an extremely high throughput (EHT) signal field (EHT-SIG) content channel 202, in accordance with one or more example embodiments of the present disclosure.

Referring to FIG. 2, the EHT-SIG content channel 202 may include a common field 204 (e.g., for all recipients) and a user specific field 206 (e.g., addressed to specific users identified by the STA ID field). The common field 204 may include 20 bits, and the user specific field 206 may include 22 bits of a user field, and also a cyclic redundancy check (CRC), a tail, and padding.

In particular, the common field 204 may include a spatial reuse field (4 bits), a guard interval plus long training field (GI+LTF) size field (2 bits), a number of EHT-LTF symbols field (3 bits), a LDPC extra symbol segment field (1 bit), a pre-PEC padding factor field (2 bits), a packet element (PE) disambiguity field (1 bit), a disregard field (4 bits), and a number of non-OFDMA users field (3 bits). The 22 bits of a user field of the user specific field 206 may include a STA identifier (STA ID) field (11 bits), a MCS field (4 bits, e.g., defining the MCS for the addressed STA), a reserved field (1 bit), a number of spatial streams (NSS) field (4 bits, e.g., signaling the number of spatial streams for the addressed STA), a beamforming field (1 bit), and a coding field (1 bit). The user specific field 206 also may include a CRC (4 bits), a tail (6 bits), and padding bits.

For a UHR-SIG for additional MCSs, more bits are required in MCS field to support unequal modulation and the newly added MCSs. For example, totally 6 bits are required to support UHR-MCSs with newly added MCSs shown in Table 2 and unequal modulation patterns shown in Table 3.

The MCS subfield in UHR-SIG needs to be defined to support both unequal modulation and newly added MCSs rather than only supporting one equal MCS as the current EHT PHY specifications. For an example with the newly added MCSs in Table 2 and unequal modulation patterns shown in Table 3, a new MCS subfield is defined in Table 4, Table 5, and Table 6, which uses 6 bits to indicate equal MCS with the newly added MCSs or unequal modulations with the unequal modulation patterns and the newly added MCSs in the cases of 2 spatial streams, 3 spatial streams, and 4 spatial streams, respectively. The basic principles of designing the new MCS field are summarized as follows. For different NSSs (Numbers of Spatial Streams), we reuse the defined 6-bit MCS subfield and map each of the 6-bit values to either an equal MCS assignment or an unequal modulation/QAM assignment. An equal MCS assignment contains a modulation/QAM with a code rate, while an unequal modulation/QAM assignment contains a modulation combination with a code rate. For each NSS, the 6-bit binary number starts from 000000 (0 in decimal) and at maximum can end at 111111 (63 in decimal). In other words, for each NSS, it can at maximum indicate 64 types of equal MCS or unequal modulations. Also, in the MCS subfield tables, the indexes represented by 6 bits of the MCS subfield of unequal modulations is ordered according to the code rate, from 1/2 to 5/6. In other words, modulation/QAM combinations with the same code rate stay together in the 6-bit indexes in the MCS subfield tables. For example, in Table 5, modulation/QAM combinations with the code rate 2/3 stay together in the 6-bit indexes from 000111 (7 in decimal) to 010001 (17). This is because in unequal modulation only modulations/QAMs are different on different spatial streams, while all spatial streams share the same code rate. Accordingly, only modulations/QAMs owning the same code rate can be combined together to constitute an unequal modulation/QAM.

A user can obtain the number of spatial streams information through the NSS subfield in the User field in the User Specific field of its UHR-SIG. After obtaining the number of spatial streams, the user can obtain its equal MCS assignment or unequal modulation/QAM assignment by checking the MCS subfield table corresponding to the obtained NSS. For example, if a user's NSS is 3 and the 6-bit binary number in its MCS subfield is 010110 (22 in decimal), the user finds its equal MCS assignment or unequal modulation/QAM assignment by checking the table of MCS subfield with 3 spatial streams. 010110 in the MCS subfield with NSS=3 indicates the unequal modulation/QAM assignment of 64QAM/64QAM/16QAM, where 64QAM, 64QAM, and 16 QAM are assigned to its first, second, and third spatial streams, respectively. In summary, our main idea is to reload the index table of the MCS subfield according to the number of spatial streams. For different numbers of spatial streams, the table of the MSC subfield indicates different sets of MCS combinations. The arrangement of the table can be different from Tables 4-6, which are organized according to code rate first and then modulation order. This idea can be applied to the MCS subfield of 802.11bn for a single user transmission on full bandwidth or an (OFDMA) RU.

Figure 3:
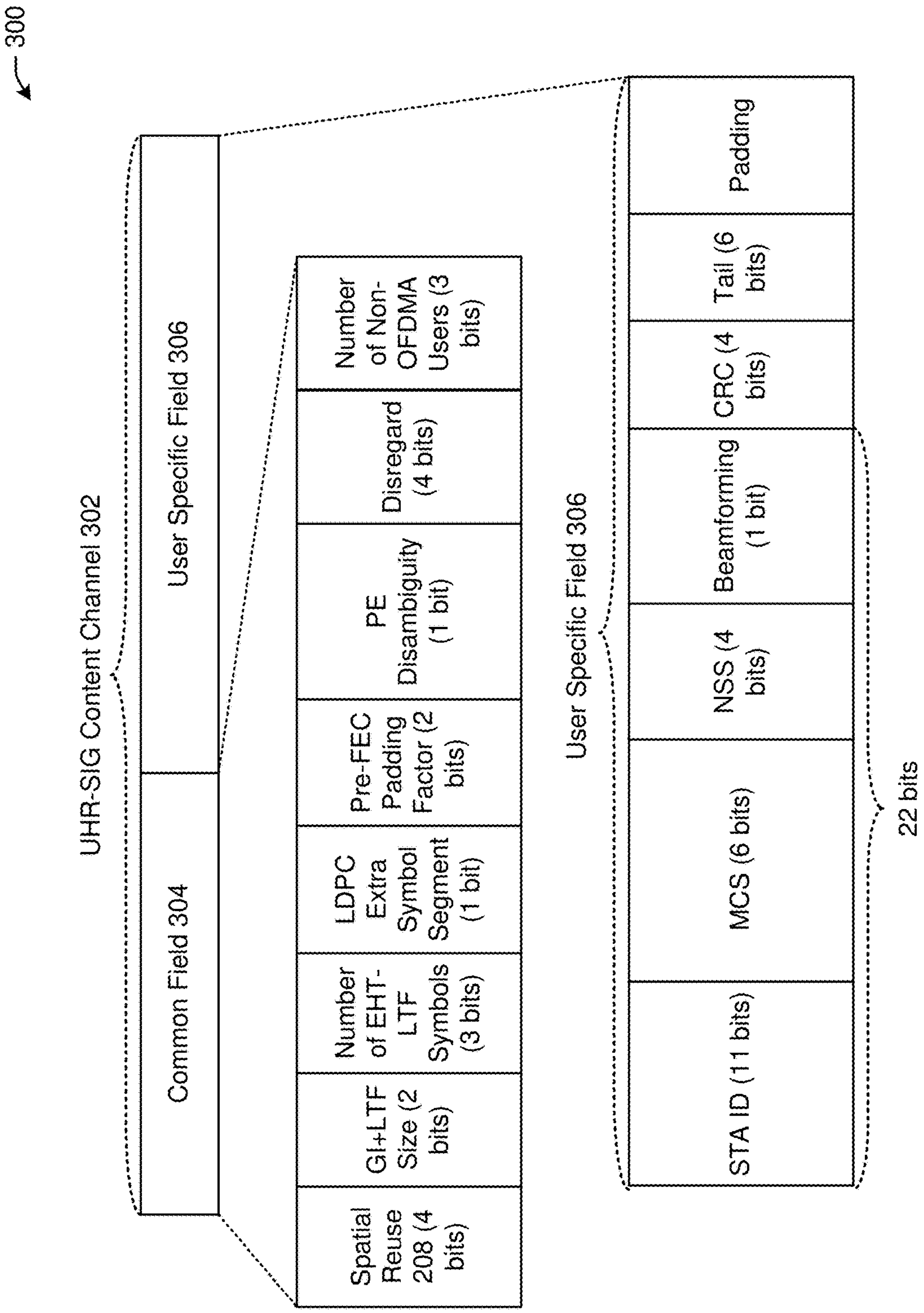
FIG. 3 is an example portion of an Ultra High Reliability (UHR) signal field content channel, in accordance with one or more example embodiments of the present disclosure.

FIG. 3 is an example portion 300 of an Ultra High Reliability (UHR) signal field content channel 302, in accordance with one or more example embodiments of the present disclosure.

The UHR-SIG field content channel 302 may use the format of the EHT-SIG content channel 202 of FIG. 2, but with a longer MCS subfield that uses additional bits (e.g., two additional bits to result in six bits) saved from the reserved bit and the coding field of the user specific field 206.

Referring to FIG. 3, the UHR-SIG field content channel 302 may include a common field 304 and a user specific field 306. The common field 304 may include 20 bits, and the user specific field 306 may include 22 bits of a user field, and also a cyclic redundancy check (CRC), a tail, and padding.

In particular, the common field 304 may include a spatial reuse field (4 bits), a guard interval plus long training field (GI+LTF) size field (2 bits), a number of EHT-LTF symbols field (3 bits), a LDPC extra symbol segment field (1 bit), a pre-PEC padding factor field (2 bits), a packet element (PE) disambiguity field (1 bit), a disregard field (4 bits), and a number of non-OFDMA users field (3 bits). The 22 bits of a user field of the user specific field 306 may include a STA identifier (STA ID) field (11 bits), a MCS field (6 bits, e.g., defining the MCS for the addressed STA), a number of spatial streams (NSS) field (4 bits, e.g., signaling the number of spatial streams for the addressed STA), and a beamforming field (1 bit). The user specific field 306 also may include a CRC (4 bits), a tail (6 bits), and padding bits.

In FIG. 3, two additional bits in the MCS subfield of UHR-SIG come from 1 reserved bit and the 1-bit Coding subfield in the user specific field 206 (e.g., the reserved bit and the 1-bit Coding subfield from the user specific field 206 are not included in the new format of FIG. 3). The coding subfield is utilized to indicate Low-Density Parity Check (LDPC) or binary convolutional code (BCC) used in a data field. In the EHT version of Wi-Fi systems (802.11be) or higher versions, generally only LDPC is applied to transmit data. Therefore, the coding subfield may be unnecessary, as only LDPC will be applied. 1 bit could be saved from the coding subfield and used in the MCS subfield. Because it is likely that 2× lifted LDPC codes will be adopted by 802.11bn as optional codes for data transmission, the 1-bit coding subfield may be still needed for indicating which of the legacy LDPC code and 2× lifted LDPC code is used in the data portion of the data PPDU. If it is not possible to repurpose 1 bit from the coding subfield, it may be necessary to repurpose another bit out of the 22-bits of the user specific field 306 or increase the user specific field 306 to 23 bits.

FIG. 4 is an example portion 400 of an Ultra High Reliability (UHR) signal field content channel 402, in accordance with one or more example embodiments of the present disclosure.

The UHR-SIG field content channel 402 may use the format of the EHT-SIG content channel 202 of FIG. 2, but with a longer MCS subfield that uses additional bits (two additional bits, resulting in six MCS bits) and elongates the user specific field 206 by two bits.

In particular, the common field 404 may include a spatial reuse field (4 bits), a guard interval plus long training field (GI+LTF) size field (2 bits), a number of EHT-LTF symbols field (3 bits), a LDPC extra symbol segment field (1 bit), a pre-PEC padding factor field (2 bits), a packet element (PE) disambiguity field (1 bit), a disregard field (4 bits), and a number of non-OFDMA users field (3 bits). The 24 bits of a user field of the user specific field 406 may include a STA identifier (STA ID) field (11 bits), a MCS field (6 bits, e.g., defining the MCS for the addressed STA), a reserved field (1 bit), a number of spatial streams (NSS) field (4 bits, e.g., signaling the number of spatial streams for the addressed STA), a beamforming field (1 bit), and a coding field (1 bit). The user specific field 206 also may include a CRC (4 bits), a tail (6 bits), and padding bits.

FIG. 5 is an example portion 500 of an Ultra High Reliability (UHR) signal field content channel 502, in accordance with one or more example embodiments of the present disclosure.

The UHR-SIG field content channel 402 may use the format of the EHT-SIG content channel 202 of FIG. 2, but with a longer MCS subfield that uses additional bits (2 additional bits, resulting in 6 bits) by reusing two bits from the disregard field of the common field 204 (reducing the disregard field from four bits to two).

In particular, the common field 504 may include a spatial reuse field (4 bits), a guard interval plus long training field (GI+LTF) size field (2 bits), a number of EHT-LTF symbols field (3 bits), a LDPC extra symbol segment field (1 bit), a pre-PEC padding factor field (2 bits), a packet element (PE) disambiguity field (1 bit), a disregard field (2 bits), and a number of non-OFDMA users field (3 bits). The 24 bits of a user field of the user specific field 506 may include a STA identifier (STA ID) field (11 bits), a MCS field (6 bits, e.g., defining the MCS for the addressed STA), a reserved field (1 bit), a number of spatial streams (NSS) field (4 bits, e.g., signaling the number of spatial streams for the addressed STA), a beamforming field (1 bit), and a coding field (1 bit). The user specific field 206 also may include a CRC (4 bits), a tail (6 bits), and padding bits.

In FIG. 5, the additional 2 bits of the user specific field 506 are acquired from disregard bits in the common field 204. Originally, there are 4 Disregard bits in the common field 204 of EHT-SIG. 2 bits out of 4 disregard bits in the common field 204 can be re-allocated to the MCS subfield for unequal modulation purpose. As a result, in UHR-SIG, disregard bits in the common field 504 reduces from 4 bits to 2 bits, and the reduced 2 bits are added to the MCS subfield, making the MCS subfield 6 bits. Moreover, the length of the common field 504 and the length of the user specific field 506 reduce from 20 bits to 18 bits and increase from 22 bits to 24 bits, respectively.

Figure 6:
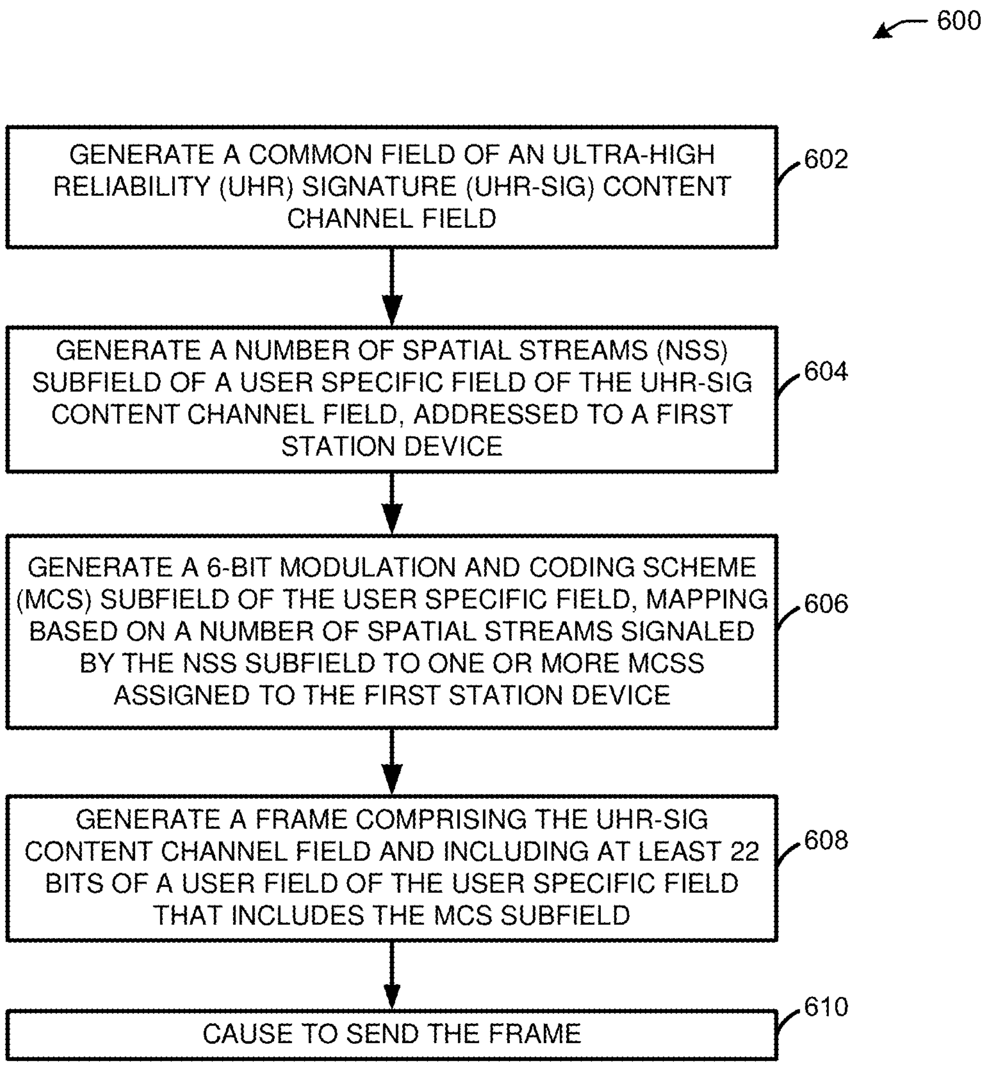
FIG. 6 illustrates a flow diagram of illustrative process for signaling multiple modulation and coding schemes for a single user, in accordance with one or more example embodiments of the present disclosure.

FIG. 6 illustrates a flow diagram of illustrative process for signaling multiple modulation and coding schemes for a single user, in accordance with one or more example embodiments of the present disclosure.

At block 602, a device (e.g., the AP 102 of FIG. 1) may generate a common field of an UHR-SIG content channel field, the common field including signaling for multiple station devices.

At block 604, the device may generate a NSS subfield of a user specific field of the UHR-SIG content channel field, the NSS subfield addressed to a first station device with a STA identifier subfield of the user specific field.

At block 606, the device may generate a 6-bit MCS subfield of the user specific field. The MCS subfield may map to one or more MCSs assigned to the first station device based on a mapping scheme that is based on the number of spatial streams signaled by the NSS (e.g., Tables 4-6).

At block 608, the device may generate a frame including the UHR-SIG content channel field, which may include a user field, of the user specific field, that is either 22 or 24 bits, including the MCS of 6 bits.

At block 610, the device may cause to send the frame.

It is understood that the above descriptions are for purposes of illustration and are not meant to be limiting.

Figure 7:
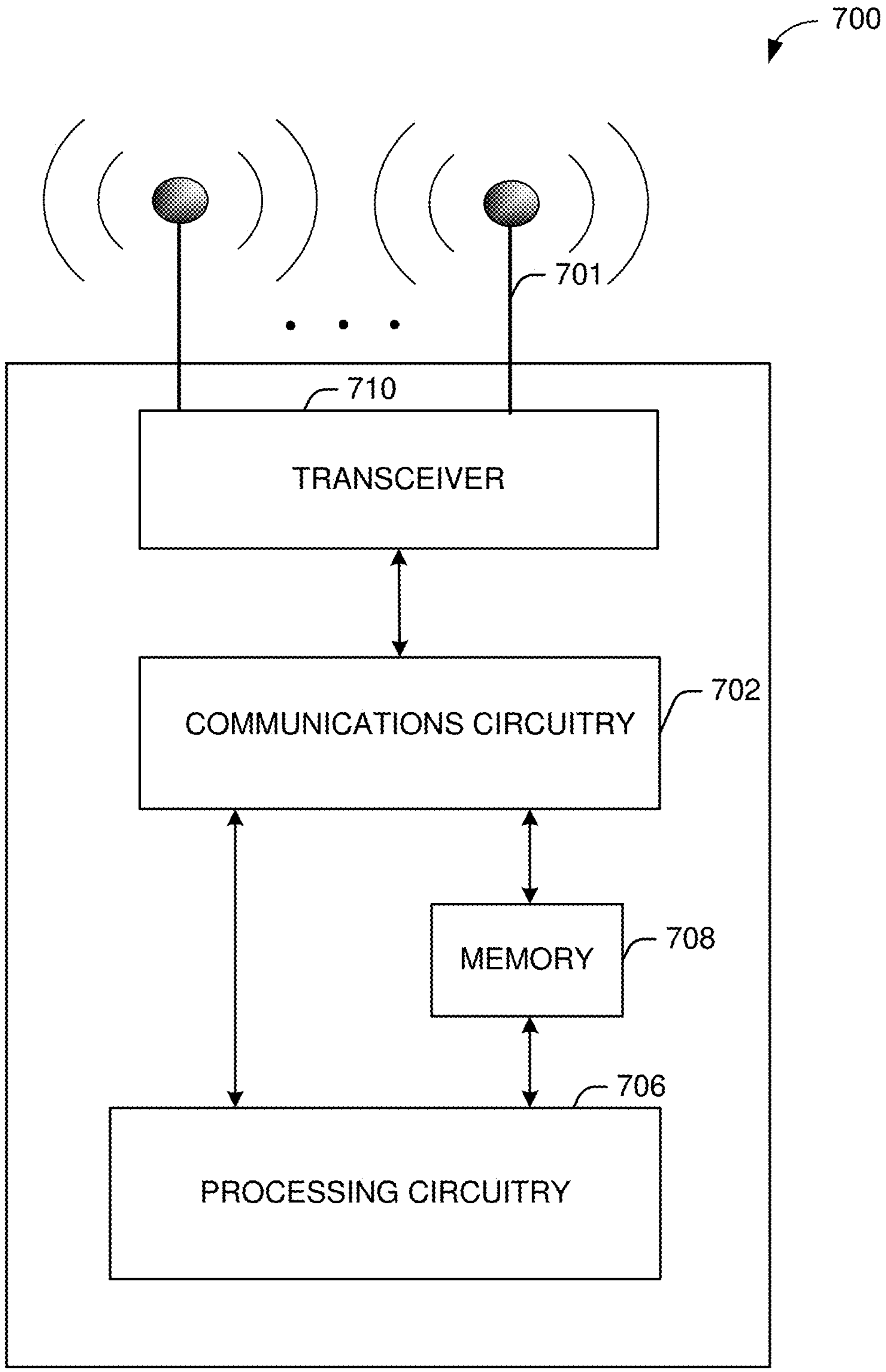
FIG. 7 illustrates a functional diagram of an exemplary communication station that may be suitable for use as a user device, in accordance with one or more example embodiments of the present disclosure.

FIG. 7 shows a functional diagram of an exemplary communication station 700, in accordance with one or more example embodiments of the present disclosure. In one embodiment, FIG. 7 illustrates a functional block diagram of a communication station that may be suitable for use as an AP 102 (FIG. 1) or a user device 120 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device.

Figure 8:
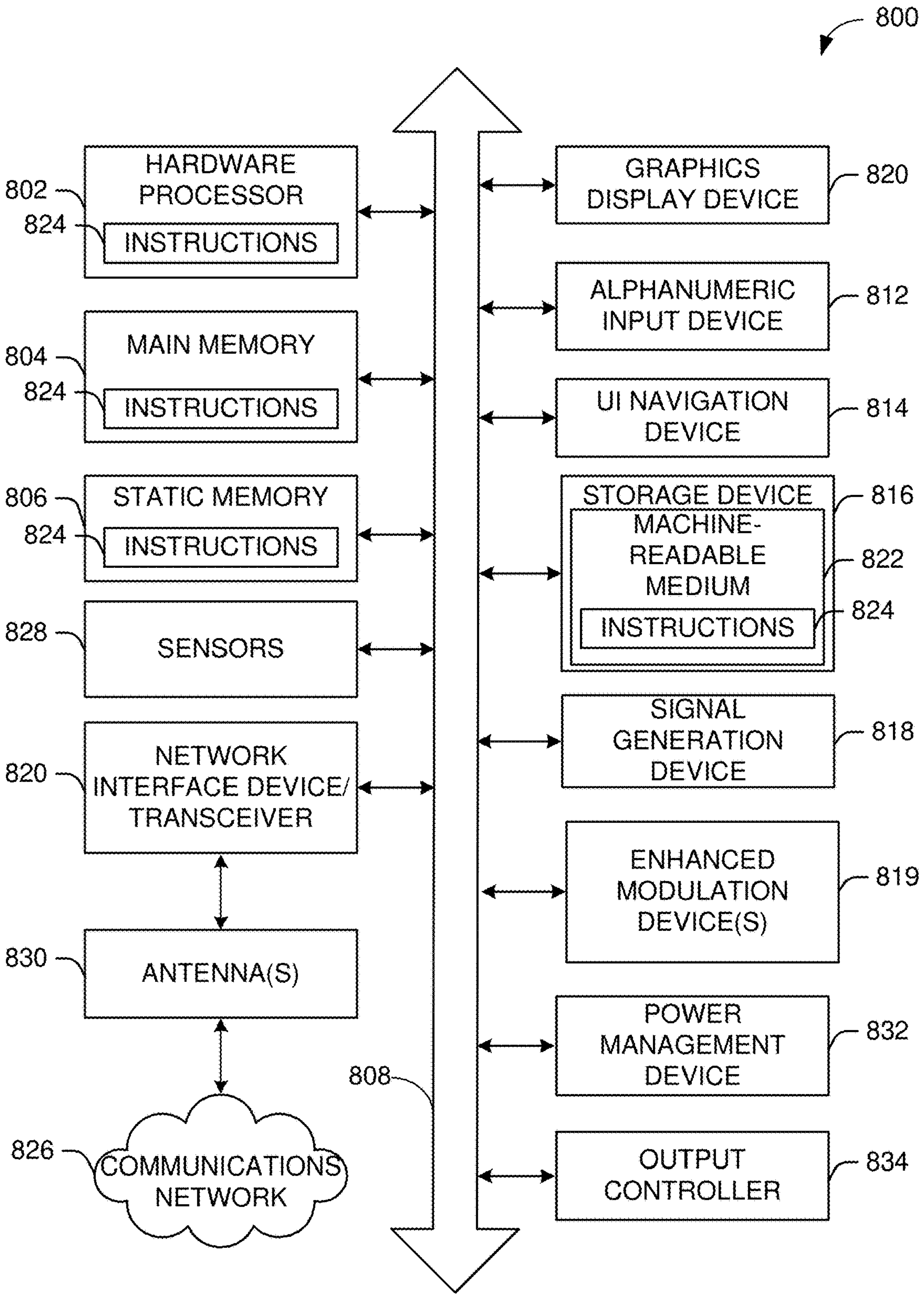
FIG. 8 illustrates a block diagram of an example machine upon which any of one or more techniques (e.g., methods) may be performed, in accordance with one or more example embodiments of the present disclosure.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), an enhanced modulation device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 802 for generation and processing of the baseband signals and for controlling operations of the main memory 804, the storage device 816, and/or the enhanced modulation device 819. The baseband processor may be provided on a single radio card, a single chip, or an integrated circuit (IC).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The enhanced modulation device 819 may carry out or perform any of the operations and processes (e.g., process 600) described and shown above.

It is understood that the above are only a subset of what the enhanced modulation device 819 may be configured to perform and that other functions included throughout this disclosure may also be performed by the enhanced modulation device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 9:
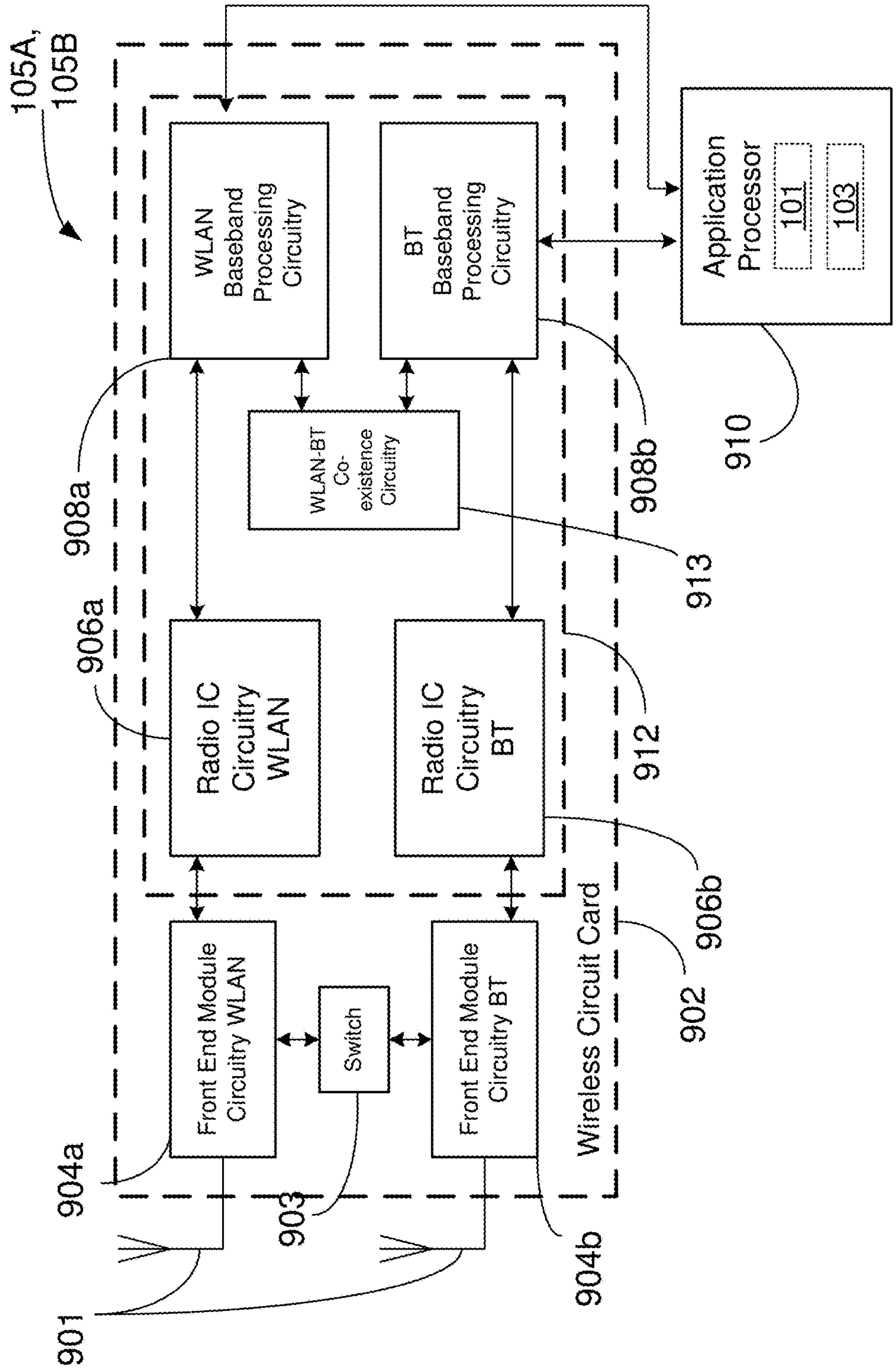
FIG. 9 is a block diagram of a radio architecture in accordance with some examples.

FIG. 9 is a block diagram of a radio architecture 105A, 105B in accordance with some embodiments that may be implemented in any one of the example AP 102 and/or the example STA 120 of FIG. 1. Radio architecture 105A, 105B may include radio front-end module (FEM) circuitry 804*a-b*, radio IC circuitry 806*a-b* and baseband processing circuitry 608*a-b*. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 904*a-b* may include a WLAN or Wi-Fi FEM circuitry 904*a* and a Bluetooth (BT) FEM circuitry 904*b*. The WLAN FEM circuitry 904*a* may include a receive signal path comprising circuitry configured to operate on WLAN RF signals received from one or more antennas 901, to amplify the received signals and to provide the amplified versions of the received signals to the WLAN radio IC circuitry 906*a* for further processing. The BT FEM circuitry 904*b* may include a receive signal path which may include circuitry configured to operate on BT RF signals received from one or more antennas 901, to amplify the received signals and to provide the amplified versions of the received signals to the BT radio IC circuitry 906*b* for further processing. FEM circuitry 904*a* may also include a transmit signal path which may include circuitry configured to amplify WLAN signals provided by the radio IC circuitry 906*a* for wireless transmission by one or more of the antennas 901. In addition, FEM circuitry 904*b* may also include a transmit signal path which may include circuitry configured to amplify BT signals provided by the radio IC circuitry 906*b* for wireless transmission by the one or more antennas. In the embodiment of FIG. 9, although FEM 904*a* and FEM 904*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 906*a-b* as shown may include WLAN radio IC circuitry 906*a* and BT radio IC circuitry 906*b*. The WLAN radio IC circuitry 906*a* may include a receive signal path which may include circuitry to down-convert WLAN RF signals received from the FEM circuitry 904*a* and provide baseband signals to WLAN baseband processing circuitry 908*a*. BT radio IC circuitry 6906*b* may in turn include a receive signal path which may include circuitry to down-convert BT RF signals received from the FEM circuitry 904*b* and provide baseband signals to BT baseband processing circuitry 908*b*. WLAN radio IC circuitry 906*a* may also include a transmit signal path which may include circuitry to up-convert WLAN baseband signals provided by the WLAN baseband processing circuitry 908*a* and provide WLAN RF output signals to the FEM circuitry 904*a* for subsequent wireless transmission by the one or more antennas 901. BT radio IC circuitry 906*b* may also include a transmit signal path which may include circuitry to up-convert BT baseband signals provided by the BT baseband processing circuitry 908*b* and provide BT RF output signals to the FEM circuitry 904*b* for subsequent wireless transmission by the one or more antennas 901. In the embodiment of FIG. 9, although radio IC circuitries 906*a* and 906*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 908*a-b* may include a WLAN baseband processing circuitry 908*a* and a BT baseband processing circuitry 908*b*. The WLAN baseband processing circuitry 908*a* may include a memory, such as, for example, a set of RAM arrays in a Fast Fourier Transform or Inverse Fast Fourier Transform block (not shown) of the WLAN baseband processing circuitry 908*a*. Each of the WLAN baseband circuitry 908*a* and the BT baseband circuitry 908*b* may further include one or more processors and control logic to process the signals received from the corresponding WLAN or BT receive signal path of the radio IC circuitry 906*a-b*, and to also generate corresponding WLAN or BT baseband signals for the transmit signal path of the radio IC circuitry 906*a-b*. Each of the baseband processing circuitries 908*a* and 908*b* may further include physical layer (PHY) and medium access control layer (MAC) circuitry, and may further interface with a device for generation and processing of the baseband signals and for controlling operations of the radio IC circuitry 906*a-b*.

Referring still to FIG. 9, according to the shown embodiment, WLAN-BT coexistence circuitry 913 may include logic providing an interface between the WLAN baseband circuitry 908*a* and the BT baseband circuitry 908*b* to enable use cases requiring WLAN and BT coexistence. In addition, a switch 903 may be provided between the WLAN FEM circuitry 904*a* and the BT FEM circuitry 904*b* to allow switching between the WLAN and BT radios according to application needs. In addition, although the antennas 901 are depicted as being respectively connected to the WLAN FEM circuitry 904*a* and the BT FEM circuitry 904*b*, embodiments include within their scope the sharing of one or more antennas as between the WLAN and BT FEMs, or the provision of more than one antenna connected to each of FEM 904*a* or 904*b*.

In some embodiments, the front-end module circuitry 904*a-b*, the radio IC circuitry 906*a-b*, and baseband processing circuitry 908*a-b* may be provided on a single radio card, such as wireless radio card 902. In some other embodiments, the one or more antennas 901, the FEM circuitry 904*a-b* and the radio IC circuitry 906*a-b* may be provided on a single radio card. In some other embodiments, the radio IC circuitry 906*a-b* and the baseband processing circuitry 908*a-b* may be provided on a single chip or integrated circuit (IC), such as IC 912.

In some embodiments, the wireless radio card 902 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay, 802.11be, 802.11-2020, and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 9, the BT baseband circuitry 908*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 10:
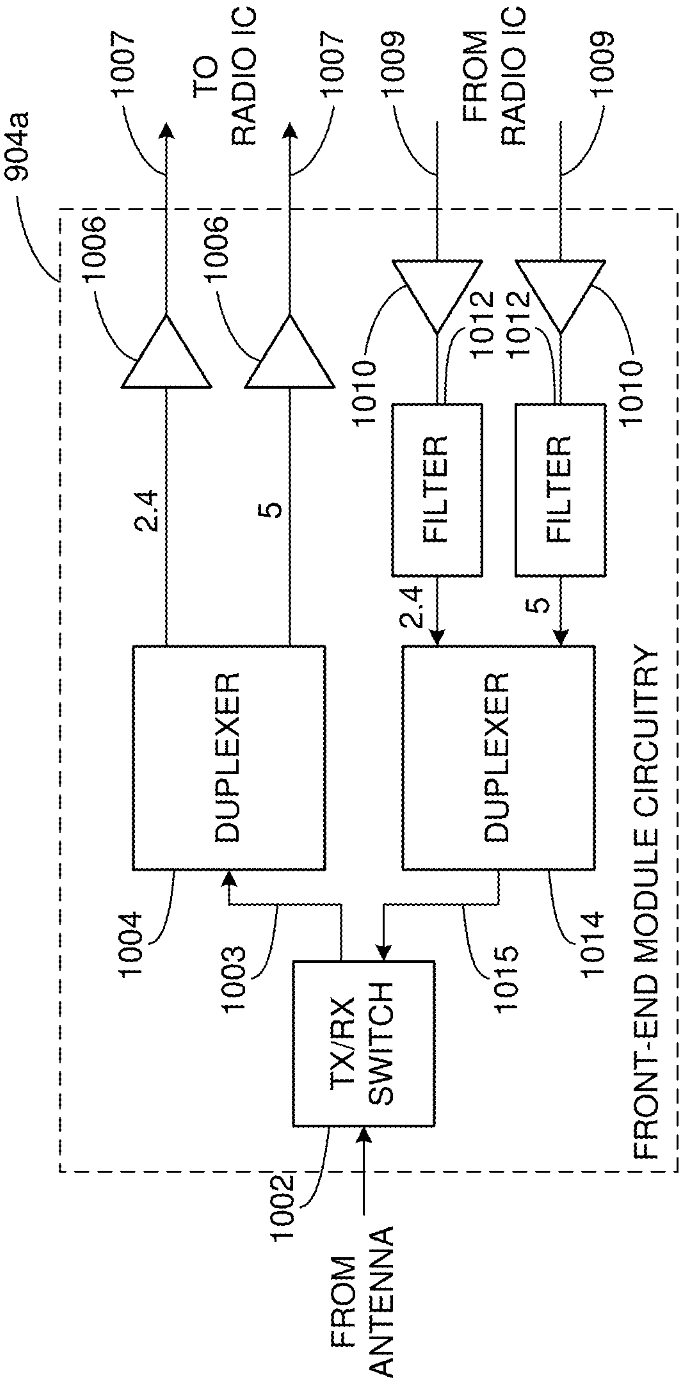
FIG. 10 illustrates an example front-end module circuitry for use in the radio architecture of FIG. 9, in accordance with one or more example embodiments of the present disclosure.

FIG. 10 illustrates WLAN FEM circuitry 904*a* in accordance with some embodiments. Although the example of FIG. 10 is described in conjunction with the WLAN FEM circuitry 904*a*, the example of FIG. 10 may be described in conjunction with the example BT FEM circuitry 904*b* (FIG. 9), although other circuitry configurations may also be suitable.

In some embodiments, the FEM circuitry 904*a* may include a TX/RX switch 1002 to switch between transmit mode and receive mode operation. The FEM circuitry 904*a* may include a receive signal path and a transmit signal path. The receive signal path of the FEM circuitry 904*a* may include a low-noise amplifier (LNA) 1006 to amplify received RF signals 1003 and provide the amplified received RF signals 1007 as an output (e.g., to the radio IC circuitry 906*a-b* (FIG. 9)). The transmit signal path of the circuitry 604*a* may include a power amplifier (PA) to amplify input RF signals 1009 (e.g., provided by the radio IC circuitry 906*a-b*), and one or more filters 1012, such as band-pass filters (BPFs), low-pass filters (LPFs) or other types of filters, to generate RF signals 1015 for subsequent transmission (e.g., by one or more of the antennas 901 (FIG. 9)) via an example duplexer 1014.

In some dual-mode embodiments for Wi-Fi communication, the FEM circuitry 904*a* may be configured to operate in either the 2.4 GHz frequency spectrum or the 5 GHz frequency spectrum. In these embodiments, the receive signal path of the FEM circuitry 904*a* may include a receive signal path duplexer 1004 to separate the signals from each spectrum as well as provide a separate LNA 1006 for each spectrum as shown. In these embodiments, the transmit signal path of the FEM circuitry 904*a* may also include a power amplifier 1010 and a filter 1012, such as a BPF, an LPF or another type of filter for each frequency spectrum and a transmit signal path duplexer 1004 to provide the signals of one of the different spectrums onto a single transmit path for subsequent transmission by the one or more of the antennas 901 (FIG. 9). In some embodiments, BT communications may utilize the 2.4 GHz signal paths and may utilize the same FEM circuitry 804*a* as the one used for WLAN communications.

Figure 11:
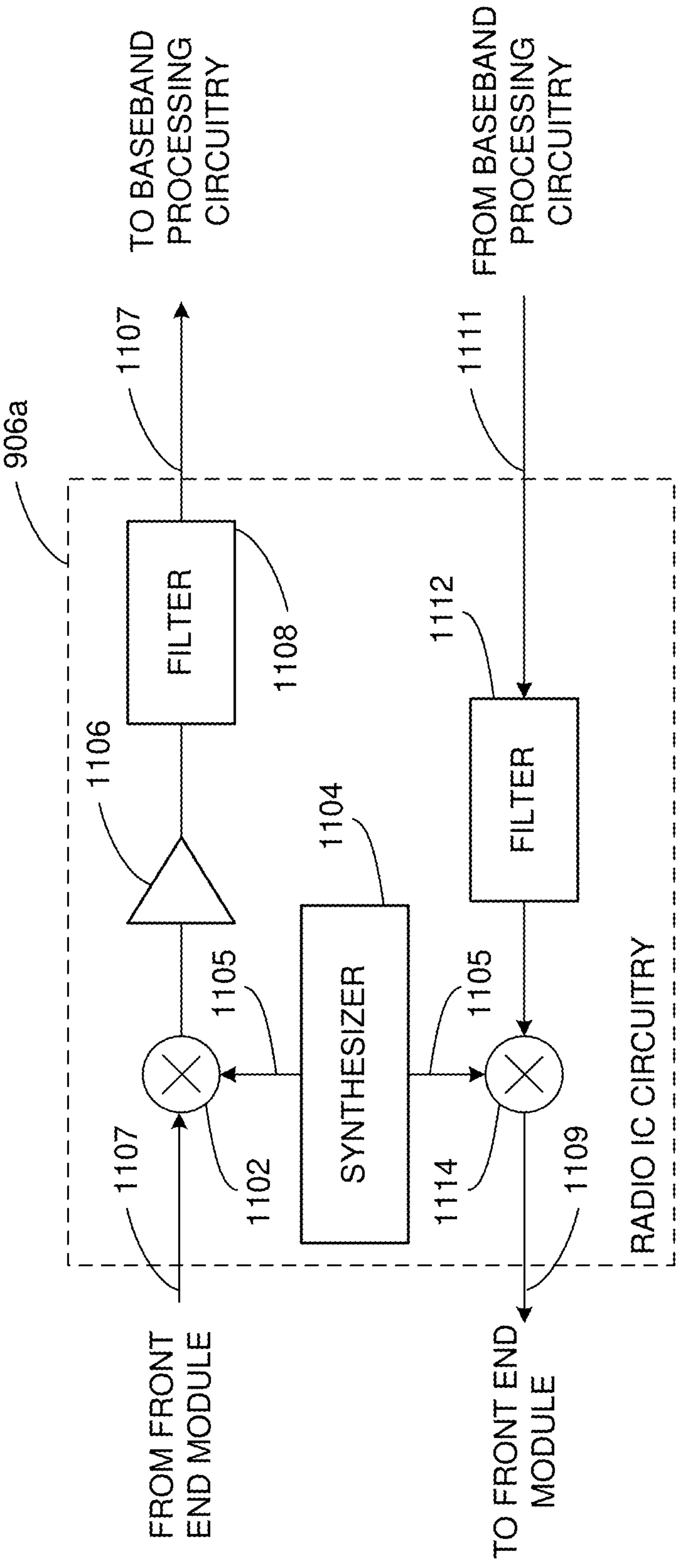
FIG. 11 illustrates an example radio IC circuitry for use in the radio architecture of FIG. 9, in accordance with one or more example embodiments of the present disclosure.

FIG. 11 illustrates radio IC circuitry 906*a* in accordance with some embodiments. The radio IC circuitry 906*a* is one example of circuitry that may be suitable for use as the WLAN or BT radio IC circuitry 906*a*/906*b* (FIG. 9), although other circuitry configurations may also be suitable. Alternatively, the example of FIG. 11 may be described in conjunction with the example BT radio IC circuitry 906*b*.

In some embodiments, the radio IC circuitry 906*a* may include a receive signal path and a transmit signal path. The receive signal path of the radio IC circuitry 906*a* may include at least mixer circuitry 1102, such as, for example, down-conversion mixer circuitry, amplifier circuitry 1106 and filter circuitry 1108. The transmit signal path of the radio IC circuitry 906*a* may include at least filter circuitry 1112 and mixer circuitry 1114, such as, for example, upconversion mixer circuitry. Radio IC circuitry 906*a* may also include synthesizer circuitry 1104 for synthesizing a frequency 1105 for use by the mixer circuitry 1102 and the mixer circuitry 1114. The mixer circuitry 1102 and/or 1114 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 11 illustrates only a simplified version of a radio IC circuitry, and may include, although not shown, embodiments where each of the depicted circuitries may include more than one component. For instance, mixer circuitry 1114 may each include one or more mixers, and filter circuitries 1108 and/or 1112 may each include one or more filters, such as one or more BPFs and/or LPFs according to application needs. For example, when mixer circuitries are of the direct-conversion type, they may each include two or more mixers.

In some embodiments, mixer circuitry 1102 may be configured to down-convert RF signals 1007 received from the FEM circuitry 904*a-b* (FIG. 6) based on the synthesized frequency 1105 provided by synthesizer circuitry 1104. The amplifier circuitry 1106 may be configured to amplify the down-converted signals and the filter circuitry 1108 may include an LPF configured to remove unwanted signals from the down-converted signals to generate output baseband signals 1107. Output baseband signals 1107 may be provided to the baseband processing circuitry 908*a-b* (FIG. 9) for further processing. In some embodiments, the output baseband signals 1107 may be zero-frequency baseband signals, although this is not a requirement. In some embodiments, mixer circuitry 1102 may comprise passive mixers, although the scope of the embodiments is not limited in this respect.

In some embodiments, the mixer circuitry 1114 may be configured to up-convert input baseband signals 1111 based on the synthesized frequency 1105 provided by the synthesizer circuitry 1104 to generate RF output signals 1009 for the FEM circuitry 904*a-b*. The baseband signals 1111 may be provided by the baseband processing circuitry 9908*a-b* and may be filtered by filter circuitry 1112. The filter circuitry 1112 may include an LPF or a BPF, although the scope of the embodiments is not limited in this respect.

In some embodiments, the mixer circuitry 1102 and the mixer circuitry 1114 may each include two or more mixers and may be arranged for quadrature down-conversion and/or upconversion respectively with the help of synthesizer 1104. In some embodiments, the mixer circuitry 1102 and the mixer circuitry 1114 may each include two or more mixers each configured for image rejection (e.g., Hartley image rejection). In some embodiments, the mixer circuitry 1102 and the mixer circuitry 1114 may be arranged for direct down-conversion and/or direct upconversion, respectively. In some embodiments, the mixer circuitry 1102 and the mixer circuitry 1114 may be configured for super-heterodyne operation, although this is not a requirement.

Mixer circuitry 1102 may comprise, according to one embodiment: quadrature passive mixers (e.g., for the in-phase (I) and quadrature phase (Q) paths). In such an embodiment, RF input signal 1007 from FIG. 10 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1105 of synthesizer 1104 (FIG. 11). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1007 (FIG. 10) may comprise a balanced signal, although the scope of the embodiments is not limited in this respect. The I and Q baseband output signals may be provided to low-noise amplifier, such as amplifier circuitry 1106 (FIG. 11) or to filter circuitry 1108 (FIG. 11).

In some embodiments, the output baseband signals 1107 and the input baseband signals 1111 may be analog baseband signals, although the scope of the embodiments is not limited in this respect. In some alternate embodiments, the output baseband signals 1107 and the input baseband signals 1111 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1104 may be a fractional-N synthesizer or a fractional N/N+1 synthesizer, although the scope of the embodiments is not limited in this respect as other types of frequency synthesizers may be suitable. For example, synthesizer circuitry 804 may be a delta-sigma synthesizer, a frequency multiplier, or a synthesizer comprising a phase-locked loop with a frequency divider. According to some embodiments, the synthesizer circuitry 1104 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1104 may be provided by a voltage controlled oscillator (VCO), although that is not a requirement. A divider control input may further be provided by either the baseband processing circuitry 908*a-b* (FIG. 9) depending on the desired output frequency 1105. In some embodiments, a divider control input (e.g., N) may be determined from a look-up table (e.g., within a Wi-Fi card) based on a channel number and a channel center frequency as determined or indicated by the example application processor 910. The application processor 910 may include, or otherwise be connected to, one of the example secure signal converter 101 or the example received signal converter 103 (e.g., depending on which device the example radio architecture is implemented in).

In some embodiments, synthesizer circuitry 1104 may be configured to generate a carrier frequency as the output frequency 1105, while in other embodiments, the output frequency 1105 may be a fraction of the carrier frequency (e.g., one-half the carrier frequency, one-third the carrier frequency). In some embodiments, the output frequency 1105 may be a LO frequency (fLO).

Figure 12:
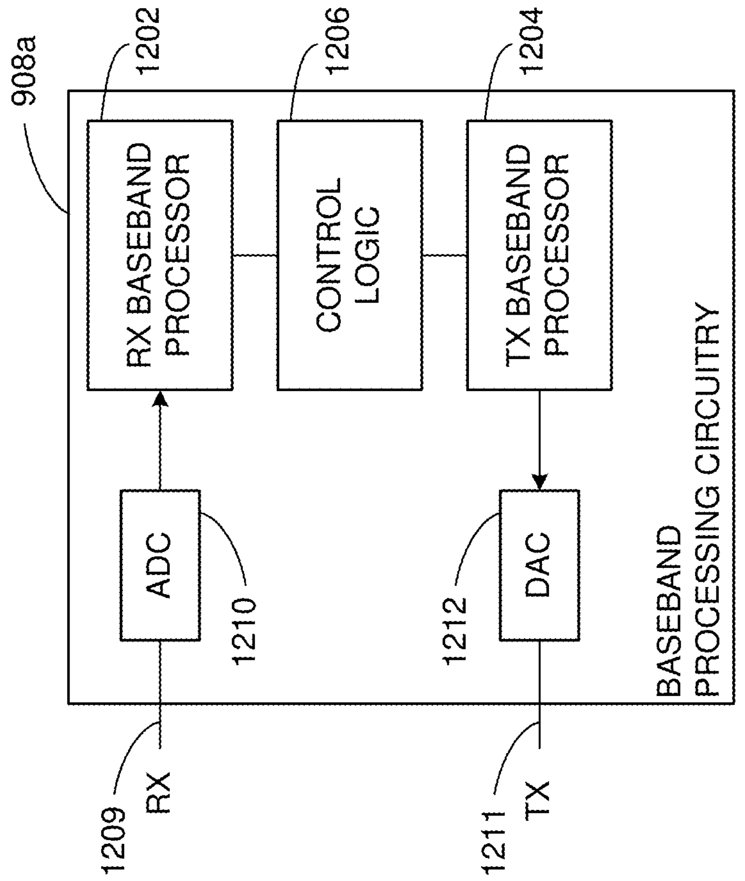
FIG. 12 illustrates an example baseband processing circuitry for use in the radio architecture of FIG. 9, in accordance with one or more example embodiments of the present disclosure.

FIG. 12 illustrates a functional block diagram of baseband processing circuitry 908*a* in accordance with some embodiments. The baseband processing circuitry 908*a* is one example of circuitry that may be suitable for use as the baseband processing circuitry 908*a* (FIG. 9), although other circuitry configurations may also be suitable. Alternatively, the example of FIG. 12 may be used to implement the example BT baseband processing circuitry 908*b* of FIG. 9.

The baseband processing circuitry 908*a* may include a receive baseband processor (RX BBP) 1202 for processing receive baseband signals 1109 provided by the radio IC circuitry 906*a-b* (FIG. 9) and a transmit baseband processor (TX BBP) 1204 for generating transmit baseband signals 1111 for the radio IC circuitry 906*a-b*. The baseband processing circuitry 908*a* may also include control logic 1206 for coordinating the operations of the baseband processing circuitry 908*a*.

In some embodiments (e.g., when analog baseband signals are exchanged between the baseband processing circuitry 908*a-b* and the radio IC circuitry 906*a-b*), the baseband processing circuitry 908*a* may include ADC 1210 to convert analog baseband signals 1209 received from the radio IC circuitry 906*a-b* to digital baseband signals for processing by the RX BBP 1202. In these embodiments, the baseband processing circuitry 908*a* may also include DAC 1212 to convert digital baseband signals from the TX BBP 1204 to analog baseband signals 1211.

In some embodiments that communicate OFDM signals or OFDMA signals, such as through baseband processor 908*a*, the transmit baseband processor 1204 may be configured to generate OFDM or OFDMA signals as appropriate for transmission by performing an inverse fast Fourier transform (IFFT). The receive baseband processor 1202 may be configured to process received OFDM signals or OFDMA signals by performing an FFT. In some embodiments, the receive baseband processor 1202 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 9, in some embodiments, the antennas 901 (FIG. 9) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 901 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include an apparatus of a device for signaling multiple modulation and coding schemes for a single user, the apparatus comprising processing circuitry coupled to storage, the processing circuitry configured to: generate a common field of an ultra-high reliability (UHR) signal (UHR-SIG) content channel field, wherein the common field comprises signaling for multiple station devices; generate a number of spatial streams (NSS) subfield of a user specific field of the UHR-SIG content channel field, wherein the user specific field is addressed to a first station device of the multiple station devices; generate a 6-bit modulation and coding scheme (MCS) subfield of the user specific field, wherein the 6-bit MCS subfield maps, based on a number of spatial streams signaled by the NSS subfield, to one or more MCSs assigned to the first station device; generate a frame comprising the UHR-SIG content channel field, wherein a user field of the user specific field comprises at least 22 bits comprising the MCS subfield; and cause to send the frame.

Example 2 may include the apparatus of example 1 and/or any other example herein, wherein the user field is a 22-bit user field comprising an 11-bit identifier of the first station device, the 6-bit MCS subfield, the NSS subfield, and a 1-bit beamforming subfield.

Example 3 may include the apparatus of example 1 and/or any other example herein, wherein the user field is a 24-bit user field comprising an 11-bit identifier of the first station device, the 6-bit MCS subfield, a reserved bit, the NSS subfield, a 1-bit beamforming subfield, and a 1-bit coding subfield, and wherein the common field is a 20-bit common field.

Example 4 may include the apparatus of example 1 and/or any other example herein, wherein the common field is an 18-bit common field comprising a 2-bit disregard subfield, and wherein the user field is a 24-bit user field comprising an 11-bit identifier of the first station device, the 6-bit MCS subfield, a reserved bit, the NSS subfield, a 1-bit beamforming subfield, and a 1-bit coding subfield.

Example 5 may include the apparatus of example 1 and/or any other example herein, wherein the number of spatial stream is two, and wherein the 6-bit MCS subfield maps to the one or more MCSs assigned to the first station device based on a first mapping scheme signaled by the NSS.

Example 6 may include the apparatus of example 5 and/or any other example herein, wherein the first mapping scheme consists of 41 MCSs.

Example 7 may include the apparatus of example 1 and/or any other example herein, wherein the number of spatial stream is three or four, and wherein the 6-bit MCS subfield maps to the one or more MCSs assigned to the first station device based on a second mapping scheme signaled by the NSS.

Example 8 may include the apparatus of example 7 and/or any other example herein, wherein the second mapping scheme consists of 51 MCSs.

Example 9 may include the apparatus of example 1 and/or any other example herein, further comprising a transceiver configured to transmit and receive wireless signals comprising the frame.

Example 10 may include the apparatus of example 9 and/or any other example herein, further comprising one or more antennas coupled to the transceiver.

Example 11 may include a non-transitory computer-readable storage medium comprising instructions to cause processing circuitry of a device for signaling multiple modulation and coding schemes for a single user, upon execution of the instructions by the processing circuitry, to: generate a common field of an ultra-high reliability (UHR) signal (UHR-SIG) content channel field, wherein the common field comprises signaling for multiple station devices; generate a number of spatial streams (NSS) subfield of a user specific field of the UHR-SIG content channel field, wherein the user specific field is addressed to a first station device of the multiple station devices; generate a 6-bit modulation and coding scheme (MCS) subfield of the user specific field, wherein the 6-bit MCS subfield maps, based on a number of spatial streams signaled by the NSS subfield, to one or more MCSs assigned to the first station device; generate a frame comprising the UHR-SIG content channel field, wherein a user field of the user specific field comprises at least 22 bits comprising the MCS subfield; and cause to send the frame.

Example 12 may include the non-transitory computer-readable medium of example 11 and/or any other example herein, wherein the user field is a 22-bit user field comprising an 11-bit identifier of the first station device, the 6-bit MCS subfield, the NSS subfield, and a 1-bit beamforming subfield.

Example 13 may include the non-transitory computer-readable medium of example 11 and/or any other example herein, wherein the user field is a 24-bit user field comprising an 11-bit identifier of the first station device, the 6-bit MCS subfield, a reserved bit, the NSS subfield, a 1-bit beamforming subfield, and a 1-bit coding subfield, and wherein the common field is a 20-bit common field.

Example 14 may include the non-transitory computer-readable medium of example 11 and/or any other example herein, wherein the common field is an 18-bit common field comprising a 2-bit disregard subfield, and wherein the user field is a 24-bit user field comprising an 11-bit identifier of the first station device, the 6-bit MCS subfield, a reserved bit, the NSS subfield, a 1-bit beamforming subfield, and a 1-bit coding subfield.

Example 15 may include the non-transitory computer-readable medium of example 11 and/or any other example herein, wherein the number of spatial stream is two, wherein the 6-bit MCS subfield maps to the one or more MCSs assigned to the first station device based on a first mapping scheme signaled by the NSS, and wherein the first mapping scheme consists of 41 MCSs.

Example 16 may include the non-transitory computer-readable medium of example 11 and/or any other example herein, wherein the number of spatial stream is three or four, and wherein the 6-bit MCS subfield maps to the one or more MCSs assigned to the first station device based on a second mapping scheme signaled by the NSS and wherein the second mapping scheme consists of 51 MCSs.

Example 17 may include a method for signaling multiple modulation and coding schemes for a single user, the method comprising: generating, by processing circuitry of an access point device, a common field of an ultra-high reliability (UHR) signal (UHR-SIG) content channel field, wherein the common field comprises signaling for multiple station devices; generating, by the processing circuitry, a number of spatial streams (NSS) subfield of a user specific field of the UHR-SIG content channel field, wherein the user specific field is addressed to a first station device of the multiple station devices; generating, by the processing circuitry, a 6-bit modulation and coding scheme (MCS) subfield of the user specific field, wherein the 6-bit MCS subfield maps, based on a number of spatial streams signaled by the NSS subfield, to one or more MCSs assigned to the first station device; generating, by the processing circuitry, a frame comprising the UHR-SIG content channel field, wherein a user field of the user specific field comprises at least 22 bits comprising the MCS subfield; and causing to send, by the processing circuitry, the frame.

Example 18 may include the method of example 17 and/or any other example herein, wherein the user field is a 22-bit user field comprising an 11-bit identifier of the first station device, the 6-bit MCS subfield, the NSS subfield, and a 1-bit beamforming subfield.

Example 19 may include the method of example 17 and/or any other example herein, wherein the user field is a 24-bit user field comprising an 11-bit identifier of the first station device, the 6-bit MCS subfield, a reserved bit, the NSS subfield, a 1-bit beamforming subfield, and a 1-bit coding subfield, and wherein the common field is a 20-bit common field.

Example 20 may include the method of example 17 and/or any other example herein, wherein the common field is an 18-bit common field comprising a 2-bit disregard subfield, and wherein the user field is a 24-bit user field comprising an 11-bit identifier of the first station device, the 6-bit MCS subfield, a reserved bit, the NSS subfield, a 1-bit beamforming subfield, and a 1-bit coding subfield.

Example 21 may include an apparatus including means for: generating a common field of an ultra-high reliability (UHR) signal (UHR-SIG) content channel field, wherein the common field comprises signaling for multiple station devices; generating a number of spatial streams (NSS) subfield of a user specific field of the UHR-SIG content channel field, wherein the user specific field is addressed to a first station device of the multiple station devices; generating a 6-bit modulation and coding scheme (MCS) subfield of the user specific field, wherein the 6-bit MCS subfield maps, based on a number of spatial streams signaled by the NSS subfield, to one or more MCSs assigned to the first station device; generating a frame comprising the UHR-SIG content channel field, wherein a user field of the user specific field comprises at least 22 bits comprising the MCS subfield; and causing to send the frame.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, and/or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An apparatus of a device for signaling multiple modulation and coding schemes for a single user, the apparatus comprising processing circuitry coupled to storage, the processing circuitry configured to:

generate a common field of an ultra-high reliability (UHR) signal (UHR-SIG) content channel field, wherein the common field comprises signaling for multiple station devices;

generate a number of spatial streams (NSS) subfield of a user specific field of the UHR-SIG content channel field, wherein the user specific field is addressed to a first station device of the multiple station devices;

generate a 6-bit modulation and coding scheme (MCS) subfield of the user specific field, wherein the 6-bit MCS subfield maps, based on a number of spatial streams signaled by the NSS subfield, to one or more MCSs assigned to the first station device;

generate a frame comprising the UHR-SIG content channel field, wherein a user field of the user specific field comprises at least 22 bits comprising the MCS subfield; and cause to send the frame.

2. The apparatus of claim 1, wherein the user field is a 22-bit user field comprising an 11-bit identifier of the first station device, the 6-bit MCS subfield, the NSS subfield, and a 1-bit beamforming subfield.

3. The apparatus of claim 1, wherein the user field is a 24-bit user field comprising an 11-bit identifier of the first station device, the 6-bit MCS subfield, a reserved bit, the NSS subfield, a 1-bit beamforming subfield, and a 1-bit coding subfield, and wherein the common field is a 20-bit common field.

4. The apparatus of claim 1, wherein the common field is an 18-bit common field comprising a 2-bit disregard subfield, and wherein the user field is a 24-bit user field comprising an 11-bit identifier of the first station device, the 6-bit MCS subfield, a reserved bit, the NSS subfield, a 1-bit beamforming subfield, and a 1-bit coding subfield.

5. The apparatus of claim 1, wherein the number of spatial stream is two, and wherein the 6-bit MCS subfield maps to the one or more MCSs assigned to the first station device based on a first mapping scheme signaled by the NSS.

6. The apparatus of claim 5, wherein the first mapping scheme consists of 41 MCSs.

7. The apparatus of claim 1, wherein the number of spatial stream is three or four, and wherein the 6-bit MCS subfield maps to the one or more MCSs assigned to the first station device based on a second mapping scheme signaled by the NSS.

8. The apparatus of claim 7, wherein the second mapping scheme consists of 51 MCSs.

9. The apparatus of claim 1, further comprising a transceiver configured to transmit and receive wireless signals comprising the frame.

10. The apparatus of claim 9, further comprising one or more antennas coupled to the transceiver.

11. A non-transitory computer-readable storage medium comprising instructions to cause processing circuitry of a device for signaling multiple modulation and coding schemes for a single user, upon execution of the instructions by the processing circuitry, to:

generate a common field of an ultra-high reliability (UHR) signal (UHR-SIG) content channel field, wherein the common field comprises signaling for multiple station devices;

generate a number of spatial streams (NSS) subfield of a user specific field of the UHR-SIG content channel field, wherein the user specific field is addressed to a first station device of the multiple station devices;

generate a 6-bit modulation and coding scheme (MCS) subfield of the user specific field, wherein the 6-bit MCS subfield maps, based on a number of spatial streams signaled by the NSS subfield, to one or more MCSs assigned to the first station device;

generate a frame comprising the UHR-SIG content channel field, wherein a user field of the user specific field comprises at least 22 bits comprising the MCS subfield; and cause to send the frame.

12. The non-transitory computer-readable medium of claim 11, wherein the user field is a 22-bit user field comprising an 11-bit identifier of the first station device, the 6-bit MCS subfield, the NSS subfield, and a 1-bit beamforming subfield.

13. The non-transitory computer-readable medium of claim 11, wherein the user field is a 24-bit user field comprising an 11-bit identifier of the first station device, the 6-bit MCS subfield, a reserved bit, the NSS subfield, a 1-bit beamforming subfield, and a 1-bit coding subfield, and wherein the common field is a 20-bit common field.

14. The non-transitory computer-readable medium of claim 11, wherein the common field is an 18-bit common field comprising a 2-bit disregard subfield, and wherein the user field is a 24-bit user field comprising an 11-bit identifier of the first station device, the 6-bit MCS subfield, a reserved bit, the NSS subfield, a 1-bit beamforming subfield, and a 1-bit coding subfield.

15. The non-transitory computer-readable medium of claim 11, wherein the number of spatial stream is two, wherein the 6-bit MCS subfield maps to the one or more MCSs assigned to the first station device based on a first mapping scheme signaled by the NSS, and wherein the first mapping scheme consists of 41 MCSs.

16. The non-transitory computer-readable medium of claim 11, wherein the number of spatial stream is three or four, and wherein the 6-bit MCS subfield maps to the one or more MCSs assigned to the first station device based on a second mapping scheme signaled by the NSS and wherein the second mapping scheme consists of 51 MCSs.

17. A method for signaling multiple modulation and coding schemes for a single user, the method comprising:

generating, by processing circuitry of an access point device, a common field of an ultra-high reliability (UHR) signal (UHR-SIG) content channel field, wherein the common field comprises signaling for multiple station devices;

generating, by the processing circuitry, a number of spatial streams (NSS) subfield of a user specific field of the UHR-SIG content channel field, wherein the user specific field is addressed to a first station device of the multiple station devices;

generating, by the processing circuitry, a 6-bit modulation and coding scheme (MCS) subfield of the user specific field, wherein the 6-bit MCS subfield maps, based on a number of spatial streams signaled by the NSS subfield, to one or more MCSs assigned to the first station device;

generating, by the processing circuitry, a frame comprising the UHR-SIG content channel field, wherein a user field of the user specific field comprises at least 22 bits comprising the MCS subfield; and causing to send, by the processing circuitry, the frame.

18. The method of claim 17, wherein the user field is a 22-bit user field comprising an 11-bit identifier of the first station device, the 6-bit MCS subfield, the NSS subfield, and a 1-bit beamforming subfield.

19. The method of claim 17, wherein the user field is a 24-bit user field comprising an 11-bit identifier of the first station device, the 6-bit MCS subfield, a reserved bit, the NSS subfield, a 1-bit beamforming subfield, and a 1-bit coding subfield, and wherein the common field is a 20-bit common field.

20. The method of claim 17, wherein the common field is an 18-bit common field comprising a 2-bit disregard subfield, and wherein the user field is a 24-bit user field comprising an 11-bit identifier of the first station device, the 6-bit MCS subfield, a reserved bit, the NSS subfield, a 1-bit beamforming subfield, and a 1-bit coding subfield.

* * * * *